US012660051B2

(12) United States Patent
Sanghvi et al.

(10) Patent No.: US 12,660,051 B2
(45) **Date of Patent: *Jun. 16, 2026**

(54) PREDICTION AND RECOVERY OF ZERO-CROSSING INFORMATION AND SELECTIVE CONTROL SIGNAL PULSE DURATION

(71) Applicant: Leviton Manufacturing Co., Inc., Melville, NY (US)

(72) Inventors: Ankit Milan Sanghvi, Hicksville, NY (US); Abhishek D. Golwala, Northvale, NJ (US); A. M. Sarwar Jahan, Jamaica, NY (US)

(73) Assignee: Leviton Manufacturing Co., Inc., Melville, NY (US)

( * ) Notice: Subject to any disclaimer, the term of this patent is extended or adjusted under 35 U.S.C. 154(b) by 15 days.

This patent is subject to a terminal disclaimer.

(21) Appl. No.: 18/768,194

(22) Filed: Jul. 10, 2024

(65) Prior Publication Data

US 2024/0373522 A1 Nov. 7, 2024

Related U.S. Application Data

(60) Continuation of application No. 18/477,646, filed on Sep. 29, 2023, now Pat. No. 12,069,779, which is a (Continued)

(51) Int. Cl.
*H05B 45/14* (2020.01)
*H05B 45/325* (2020.01)
*H05B 47/16* (2020.01)

(52) U.S. Cl.
CPC ........... *H05B 45/14* (2020.01); *H05B 45/325* (2020.01); *H05B 47/16* (2020.01)

(58) Field of Classification Search
CPC ........ H05B 45/14; H05B 47/16; H05B 47/10; H05B 45/325; H05B 45/31; Y02B 20/40
See application file for complete search history.

(56) References Cited

U.S. PATENT DOCUMENTS 4,894,621 A 1/1990 Koenig et al.
5,020,026 A 5/1991 Schreck et al.
(Continued)

FOREIGN PATENT DOCUMENTS

WO 2020068089 A1 4/2020

OTHER PUBLICATIONS

Ex Parte Quayle Office Action issued in U.S. Appl. No. 17/058,876 on Sep. 21, 2023, 56 pgs. Sep. 21, 2023.
(Continued)

*Primary Examiner* — Raymond R Chai
(74) *Attorney, Agent, or Firm* — Matthew M. Hulihan; Heslin Rothenberg Farley Mesiti P.C.

(57) ABSTRACT

Operating an electrical load controller includes determining a firing angle at which to fire a switching circuit of the electrical load controller and selecting a control signal pulse duration between a fixed duration and a variable duration based on the firing angle and on whether voltage sag is present in an alternating current (AC) waveform, then controlling a supply of AC power to a load based on the selected duration. An electrical load controller and method of operating such is also provided, in which a detection window is selected for detecting zero-crossings (ZC) of an AC waveform, a ZC signal is monitored and a time of a next ZC is ascertained, and a supply of AC power to a load is controlled using the ascertained time.

23 Claims, 13 Drawing Sheets

Related U.S. Application Data division of application No. 17/058,876, filed as application No. PCT/US2020/060328 on Nov. 13, 2020, now Pat. No. 11,903,105.

(60) Provisional application No. 63/028,056, filed on May 21, 2020.

(56) References Cited

U.S. PATENT DOCUMENTS

| | | | | |
|---|---|---|---|---|
| 6,380,692 | B1 | 4/2002 | Newman, Jr. | |
| 6,717,394 | B2 | 4/2004 | Elms | |
| 8,324,761 | B2 | 12/2012 | Elliot et al. | |
| 8,618,751 | B2 | 12/2013 | Ostrovsky et al. | |
| 9,681,526 | B2 | 6/2017 | Ostrovsky et al. | |
| 9,860,949 | B2 | 1/2018 | Tyson et al. | |
| 9,974,152 | B2 | 5/2018 | Ostrovsky et al. | |
| 10,251,228 | B1 | 4/2019 | Lester et al. | |
| 10,568,185 | B1 | 2/2020 | Ostrovsky et al. | |
| 11,301,013 | B2 | 4/2022 | Bull | |
| 11,464,096 | B2 | 10/2022 | Ostrovsky et al. | |
| 11,515,779 | B2 | 11/2022 | Yokum et al. | |
| 11,871,493 | B2 | 1/2024 | Yokum et al. | |
| 11,903,105 | B2 * | 2/2024 | Sanghvi | H05B 47/16 |
| 2002/0070719 | A1 | 6/2002 | Amarillas et al. | |
| 2003/0178892 | A1 | 9/2003 | Black et al. | |
| 2005/0146288 | A1 * | 7/2005 | Johnson | H05B 39/083 315/360 |
| 2005/0275354 | A1 | 12/2005 | Hausman et al. | |
| 2006/0279236 | A1 * | 12/2006 | Johnson | H05B 39/086 315/291 |
| 2007/0110192 | A1 | 5/2007 | Steiner | |
| 2007/0188025 | A1 | 8/2007 | Keagy et al. | |
| 2007/0262654 | A1 | 11/2007 | Mosebrook et al. | |
| 2008/0024074 | A1 | 1/2008 | Mosebrook et al. | |
| 2010/0060187 | A1 | 3/2010 | Newman et al. | |
| 2010/0194304 | A1 | 8/2010 | Mosebrook et al. | |
| 2010/0283391 | A1 | 11/2010 | Braunshtein | |
| 2012/0074792 | A1 * | 3/2012 | Hodges | H02H 3/12 307/126 |
| 2012/0229170 | A1 | 9/2012 | Scholder | |
| 2013/0162168 | A1 * | 6/2013 | Ostrovsky | H05B 41/392 323/320 |
| 2013/0181630 | A1 | 7/2013 | Taipale et al. | |
| 2013/0293137 | A1 | 11/2013 | Jennings et al. | |
| 2014/0081474 | A1 | 3/2014 | Blakeley | |
| 2014/0327372 | A1 | 11/2014 | Zhang et al. | |
| 2016/0278176 | A1 | 9/2016 | Chen | |
| 2017/0150566 | A1 | 5/2017 | Vanderzon | |
| 2017/0171950 | A1 | 6/2017 | Barna et al. | |
| 2017/0223808 | A1 | 8/2017 | Barna et al. | |
| 2018/0115161 | A1 | 4/2018 | Marsh-Croft | |
| 2018/0160494 | A1 | 6/2018 | Vanderzon | |
| 2019/0191518 | A1 | 6/2019 | Guan et al. | |
| 2020/0084852 | A1 | 3/2020 | Dejonge et al. | |
| 2021/0289596 | A1 | 9/2021 | Vanderzon et al. | |
| 2021/0321502 | A1 | 10/2021 | Ostrovsky et al. | |
| 2021/0367502 | A1 | 11/2021 | Yokum | |
| 2021/0368598 | A1 | 11/2021 | Sanghvi et al. | |

OTHER PUBLICATIONS

International Search Report and Written Opinion for PCT/US2020/070109 completed Aug. 18, 2020, 15 pgs. Aug. 8, 2020.

International Search Report and Written Opinion for PCT/US2018/053260 completed Nov. 15, 2018, 9 pgs. Nov. 15, 2018.

International Search Report and Written Opinion for PCT/US2020/060328 completed Mar. 30, 2021, 22 pgs. Mar. 30, 2021.

Non Final Office Action issued in U.S. Appl. No. 17/267,520 on Dec. 8, 2021, 6 pgs. Dec. 8, 2021.

Non Final Office Action issued in U.S. Appl. No. 17/267,520 on Aug. 10, 2021, 15 pgs. Aug. 10, 2021.

Notice of Allowance issued in U.S. Appl. No. 17/267,520 on Jun. 2, 2022, 8 pgs. Jun. 2, 2022.

Office Action issued in U.S. Appl. No. 18/049,348 on Feb. 13, 2023, 48 pgs. Feb. 13, 2023.

Notice of Allowance issued in U.S. Appl. No. 17/325,164 on Jul. 28, 2022, 14 pgs. Jul. 28, 2022.

Office Action issued in U.S. Appl. No. 17/804,005 on Mar. 1, 2023, 17 pgs. Mar. 1, 2023.

Notice of Allowance issued in U.S. Appl. No. 17/804,005 on Sep. 1, 2023, 9 pgs. Sep. 1, 2023.

Office Action in U.S. Appl. No. 17/325,164 dated Apr. 25, 2022, 39 pgs. Apr. 25, 2022.

Notice of Allowance issued in U.S. Appl. No. 18/477,646 on Apr. 11, 2024. 26 pgs. Apr. 11, 2024.

Non-Final Office Action for U.S. Appl. No. 18/405,668 dated Jun. 11, 2025. 49 pgs.

* cited by examiner

PREDICTION AND RECOVERY OF ZERO-CROSSING INFORMATION AND SELECTIVE CONTROL SIGNAL PULSE DURATION

BACKGROUND

Typical electrical load controllers, such as lighting control dimmers for controlling brightness of a lighting load, vary the supply of power to the electrical load by varying the points during the alternating current (AC) waveform at which power is switched on and off to the attached electrical load by a switching circuit. Microprocessor-based electrical load controllers detect the zero-crossings of the AC waveform and switch on/off the power to the load at fixed times relative to the zero-crossings in order to achieve the desired supply of AC power to the load (e.g. proper lighting level of a lighting load). Precise control of these switching points of the control signal applied to the switching circuit to control its switching can be important. In the case of a lighting load, proper control of the switching points can minimize perceived variation in the brightness of the light and minimize flickering of the light. In this regard, some lighting loads (or "lamps") have a characteristic, based on current through the lighting load for instance, where the switching circuit unlatches during the conduction cycle.

SUMMARY

Shortcomings of the prior art are overcome and additional advantages are provided. In one embodiment, a method of operating an electrical load controller includes, based on a desired load level setting of the electrical load controller, determining a firing angle, of an alternating current (AC) waveform, at which to fire a switching circuit of the electrical load controller to selectively control the switching circuit to conduct a supply of AC power to a load. The firing angle corresponds to a firing delay time, after zero-crossings of the AC waveform, at which to fire the switching circuit. The method also includes detecting whether a voltage sag is present in the AC waveform, and selecting a control signal pulse duration. The control signal pulse duration is a duration of time for a control signal to be held in an ON state to latch the switching circuit to conduct the supply of AC power to the load. The selecting the control signal pulse duration includes selecting, for the control signal pulse duration, and based on the determined firing angle, between: (i) a fixed duration of time that begins at the firing delay time and ends after the fixed duration of time; and (ii) a variable duration of time. The selecting is based further on determining that the firing delay time is less than a first threshold delay, and on the detecting whether the voltage sag is present in the AC waveform. The method additionally includes controlling the supply of AC power to the load based on the selected control signal pulse duration, wherein the controlling holds the control signal in the ON state for the selected control signal pulse duration in selectively controlling the switching circuit to conduct the supply of AC power to the load.

In another embodiment, an electrical load controller is provided for controlling conduction of a supply of alternating current (AC) power to a load. The electrical load controller includes a line input terminal and a load output terminal, the line input terminal configured to be electrically coupled to the supply of AC power, and the load output terminal configured to be electrically coupled to the load. The electrical load controller also includes a switching circuit electrically coupled in series between the line input terminal and the load output terminal, the switching circuit having an ON state in which the switching circuit conducts the supply of AC power to the load, and an OFF state in which the switching circuit does not conduct the supply of AC power to the load. The switching circuit is configured to be selectively controlled by varying a control signal to the switching circuit between the ON state and the OFF state. The electrical load controller further includes a controller that is configured to perform selecting a detection window of time having a duration based on a predetermined duration of time, the selected detection window extending from a selected first time to a selected second time and straddling an expected time of a next zero-crossing of an alternating current (AC) waveform the AC waveform oscillating though full cycles, each full cycle including a positive half cycle and a negative half cycle. The controller is further configured to perform monitoring a zero-crossing signal for a zero-crossing indication, of the next zero-crossing, occurring within the selected detection window, ascertaining a time of the next zero-crossing based on the monitoring, and selectively controlling a supply of AC power to a load, where the controlling uses the ascertained time of the next zero-crossing of the AC waveform to fire a switching circuit of the electrical load controller.

In yet another embodiment, a method of operating an electrical load controller is provided that includes selecting a detection window of time having a duration based on a predetermined duration of time, the selected detection window extending from a selected first time to a selected second time and straddling an expected time of a next zero-crossing of an alternating current (AC) waveform, the AC waveform oscillating though full cycles, each full cycle comprising a positive half cycle and a negative half cycle. The method also includes monitoring a zero-crossing signal for a zero-crossing indication, of the next zero-crossing, occurring within the selected detection window, ascertaining a time of the next zero-crossing based on the monitoring, and selectively controlling a supply of AC power to a load, wherein the controlling uses the ascertained time of the next zero-crossing of the AC waveform to fire a switching circuit of the electrical load controller.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
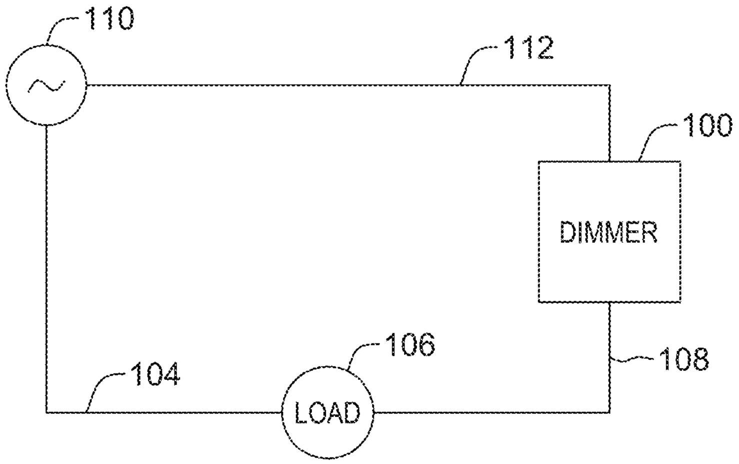
FIG. 1 depicts an example of a dimming system including a two-wire dimmer.

Described herein are approaches for prediction and recovery of zero-crossing information and improved switching in conditions of line voltage sag. Examples presented herein refer to a lighting load as an example electrical load and a dimmer as an example electrical load controller. References to 'brightness' in a lighting load dimmer are more generically a reference to the desired load level setting of the electrical load controller. However, aspects described herein are applicable to any of various other types of electrical load controllers that control supply of power to any of various other types of electrical loads. For instance, an electrical load controller could be a fan speed controller to control a supply of power to a fan or blower, as an example. Many other examples exist.

By way of background, many countries have an electric grid infrastructure that uses alternating current as a power source (referred to herein as an "AC source"). These systems can be either balanced or unbalanced and may include a phase line ("phase conductive path") and a return path (usually referred to as a "neutral" line or "neutral conductive path"). The "neutral" conductive path can be used as a return path for the AC source supplied by a phase conductive path. A conductive path can also be referred to as a "wire". The terms "conductive path", "conductor", and "wire" are considered herein to be synonymous. For safety reasons, the neutral wire is typically grounded at some juncture, for instance the main electrical panel. Although a ground wire is typically present at all electrical boxes, a neutral wire may not be present in some electrical boxes, such as switch boxes used to control a lighting load. In such instances, the electrical box typically contains a phase wire, a load wire, and a ground wire (or ground connection via a metal sheath of the electrical cable). As such, the lighting load is to be controlled by a device referred to as a "two-wire device" (examples of which are a switch or a dimmer), where the phrase "two-wire" refers to the phase wire and the load wire (e.g. the absence of a neutral wire). As such, a two-wire device does not exclude the possibility of the device being connected to a third, ground wire.

Many dwellings and office buildings use either a single or multi-phase AC source and/or some combination thereof. The AC source may be accessed by standardized connections (referred to as "plugs") that prevent a user from improperly connecting to an AC source, e.g., a three-phase AC plug cannot connect to a two-phase AC outlet. Additionally, many AC sources may selectively apply electricity to a load based upon whether a switch is turned on or off, e.g., a light switch.

In some approaches, zero-crossings of an input line voltage (AC waveform) are detected by detecting a change in the polarity of the voltage across (i) an input line voltage terminal and an output load terminal or lead, in the case of two-wire devices without a neutral connection, or (ii) the input line voltage terminal and return neutral or ground wire terminal, as in three wire devices with a neutral connection or two-wire devices using a ground leakage path. "Terminal" can be any type of terminal, lead or other termination, and includes, but is not limited to, a screw terminal, which is just one example of a terminal of a dimmer circuit. In some embodiments, a direct connection by a dimmer circuit to a neutral side N of the AC power source can be available, enabling the dimmer circuit to be configured as a three-wire dimmer circuit.

Figure 2:
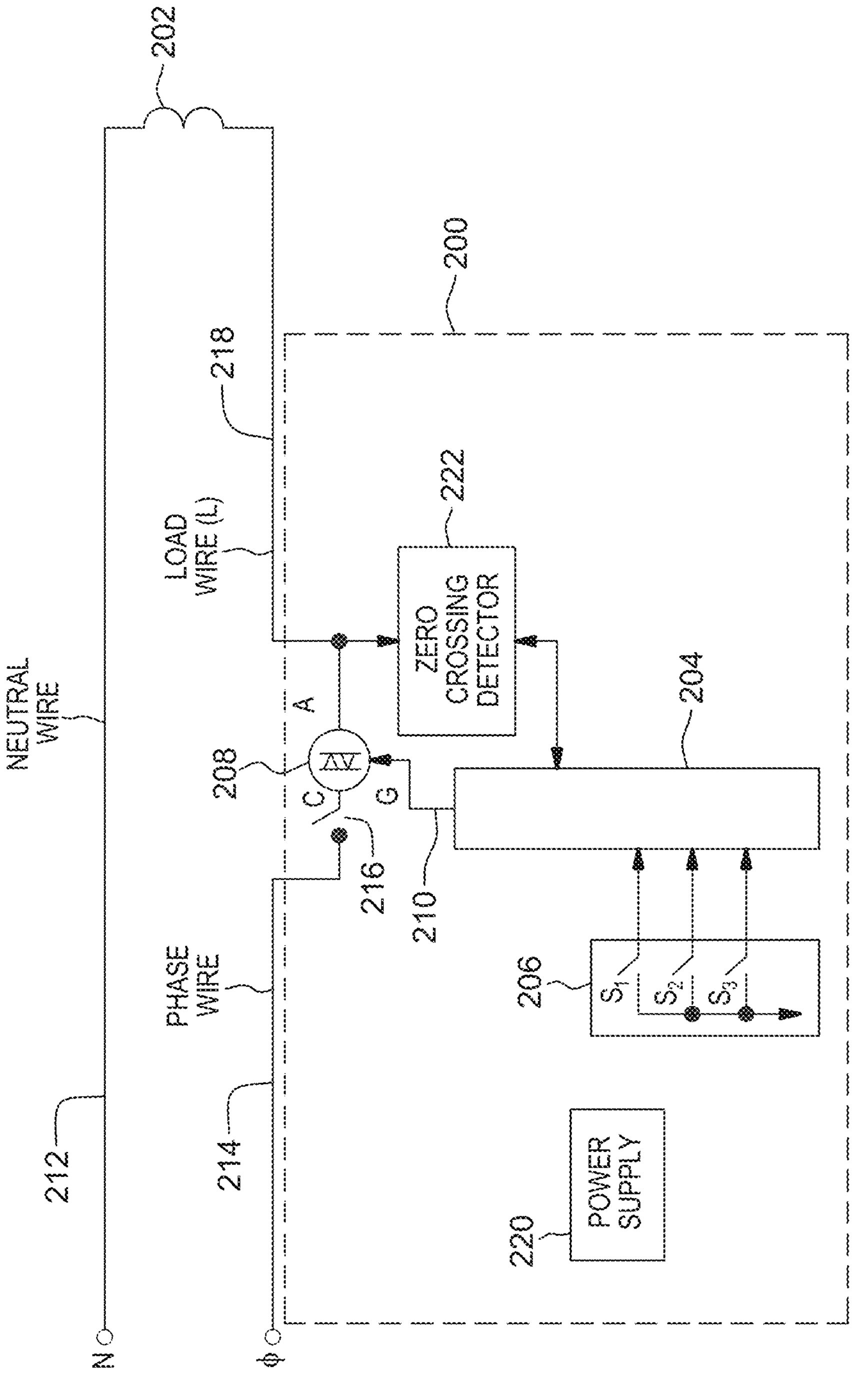
FIG. 2 depicts further details of an example two-wire dimmer.

FIGS. 1 and 2 depict example dimming systems that including a two-wire dimmer. While two-wire dimmers are discussed, it is noted that aspects described herein can apply as well to three-wire dimmers.

In particular, FIG. 1 depicts an example of a dimming system including a two-wire dimmer. Two-wire dimmer 100 is shown, whereby current travels from AC source 110 via phase conductive path 112 through dimmer 100 and through load 106 via load wire or conductive path 108 to AC source 110 via neutral wire or conductive path 104. The dimmer 100 includes a circuit to control the power delivered to the load 106 by "chopping" the current coming from AC source 110. A controller/microcontroller may operate a power switch to regulate the power delivered to the load using a phase control technique. The AC source has a sinusoidal waveform that oscillates through cycles. More specifically, each sinusoidal cycle is referred to as a full cycle. Each full cycle includes a positive half cycle and a negative half cycle that complete a single full cycle of the AC power. The positive half cycle begins at a first zero-crossing of the full cycle and ends at a midpoint zero-crossing at the midpoint of the full cycle. The negative half cycle begins at the midpoint zero-crossing of the full cycle and ends at another zero-crossing at the end of the full cycle. For typical 60 Hz power, an entire AC cycle occurs in 1/60th of a second.

When employing "forward phase" dimming with a latching power switch or "switching circuit" (e.g., a TRIAC), the power switch remains off at the beginning of an AC half-cycle during a delay period until the desired firing angle is reached. The TRIAC is turned on at a firing angle by applying one or more pulses via a control signal to the gate of the TRIAC to connect the AC source to the load. Alternately, a constant/long duration pulse (as opposed to discrete pulses) can be supplied to the gate of the TRIAC to hold the TRIAC in a conducting state for the remainder of the half cycle regardless of the level of current being conducted through the load. The portion of the AC voltage waveform actually applied to the load is that portion extending from the firing time to the end of, or near the end of, the half cycle. The portion of the AC voltage waveform applied during that portion of the AC cycle is referred to as the conduction period of the positive half cycle. The TRIAC continues conducting power to the load during this time until it switches off at (or near) the midpoint zero-crossing. In this regard, TRIACs are self-commutating devices, meaning that they would typically turn themselves off when the current through the device falls below a holding level after the control signal has been removed. The same process can be repeated for the negative half cycle, in which the TRIAC turns on after a delay period and turns off at (or near) the next zero-crossing, if the switching schedule is to fire in both half cycles of each full cycle. In this regard, it is noted that switching may occur in only the positive, only the negative, or in both positive and negative half cycles of the AC waveform, if desired. Generally, if the load is purely resistive, the current flowing through the load is essentially synchronized with the AC voltage applied to the load, with no phase shift between the current and the voltage. Additionally, the firing delay periods for the two half cycles of a full cycle are generally equal in duration, though they could be different.

Varying the conduction period varies the percentage of available power delivered to the load, thereby regulating the total amount of power delivered to the load. If the load is a lighting load, regulating the amount of power controls the brightness of the load.

It is understood that while other types of power switches, like metal-oxide semiconductor field-effect transistor (MOSFETs) and insulated-gate bipolar transistors (Gibbets), are similarly used to control conduction and firing angles, the controlling of these switches may be different from the manner described above, which is provided by way of example only.

Some power switches, such as transistors and relays, receive a constant gate signal during the entire conduction period. Other power switches, such as TRIACs and silicon-controlled rectifiers (SCRs), have regenerative switching properties that cause them to latch in the conductive state in response to short gate pulse(s) if the load current exceeds a latching level. Once in the conductive state, the power switch remains conductive-even if the control signal is removed-until the current through the switch drops below a holding level. At that point, the power switch automatically switches off. This typically occurs when the load current drops below the holding level at or near a zero-crossing.

By way of specific example, a gate pulse may be used for a transistor or other power switch requiring a continuous gate pulse during the entire conduction period. This may also be referred to as a continuous signal or a 'constant gate control signal'. Thus, the gating operation consumes power during the entire conduction period. This technique can be, and in some instances is, used to maintain a latching power switch such as a TRIAC or SCR in a conducting state when there may otherwise not be enough current to do so.

In examples where only a short gate pulse is used to trigger a TRIAC or SCR and latch for substantially the remainder of the half cycle, the gating operation consumes power only during a small fraction (duration of the short gate pulse) of the conduction period, thereby reducing the overall power consumption.

A short gate pulse gating technique may work adequately with a purely resistive load, however a different set of challenges is presented when used with loads having an inductive or nonlinear characteristic. Noise can appear on the current through the load leading to a misfiring. For example, the current drawn by a magnetic low-voltage (MLV) load typically does not follow the waveform of the AC source (e.g. input voltage) to the dimmer. Instead, since the current is delayed (e.g. lagging) with respect to the AC voltage, a misfiring event could lead to an asymmetry in the current waveform, which causes saturation of the transformer of the MLV load and results in a large inrush of current. In this situation, the misfiring event could interrupt the current flowing through the load, which causes a relatively large voltage kickback due to the inductive nature of the load. This is in contrast to a resistive load in which the current corresponds directly with the voltage waveform without a phase shift. If a short gate pulse is applied to the TRIAC during the time period between the start of the cycle and the time at which current draw begins, the MLV load may fail to turn on and/or remain on. That is, since the gate pulse is applied at a time when the MLV load draws no current, the switching device, e.g., the TRIAC, may not turn on at all, and the entire half cycle of conduction may be missed. Alternatively, if the gate pulse is applied at a time when the load may draw some current, but not enough to latch the TRIAC in the conductive state, the load may receive power only during the duration of the gate pulse, and the result may be a short flash of light from the load, i.e., flicker. Thus, the firing angle corresponding to the time at which current draw begins could represent the limit for maximum brightness, i.e., the maximum possible conduction time.

Likewise, there is typically a firing angle corresponding to a minimum brightness close to the end of the half cycle. If the TRIAC is gated too late, it may fail to conduct any power to the MLV load or it may only conduct during the gate pulse period if the MLV load does not draw enough current to latch the TRIAC or hold the TRIAC in the conductive state for the appropriate length of time. The result may be a flicker of light, or the lamp may turn off abruptly rather than dimming smoothly as the lower end to the dimming range is approached. Problems at the lower end of the range may be compounded by the decreasing line voltage that is available, as well as the short duration of the conduction period through the TRIAC. The above problems may also be seen with other types of loads, other than MLV.

The firing angles for minimum and maximum brightness for any given load, however, may not be known in advance. Moreover, the firing angle limits may change due to variations in operating conditions such as lamp wattage, number of lamps on the circuit, line voltage, temperature, etc., as well as variations between lamps from different manufacturers, manufacturing tolerances, lamp age, etc.

One way to assure that the TRIAC will be triggered when operating near the point of maximum brightness is to continue gating the TRIAC during the entire conduction period. Then, even if the gate pulse begins before the time at which current draw begins, the continuous gating assures that the TRIAC will eventually begin conducting to the MLV when the MLV load begins drawing current. This may, however, consume more power than the power supply can provide.

Another technique for overcoming uncertainty in the precise timing to trigger switch firing near the points of minimum and maximum brightness involves the use of multiple gate pulses. Using a sufficient number of pulses over an appropriate length of time can assure that at least one of the pulses will trigger the TRIAC at a time when the load will draw enough current to latch the TRIAC. Two-wire dimmers may be limited in the amount of power they can draw through the load because the input sine wave (i.e. input power) is distributed between the load and the power supply for the dimmer. During a conduction cycle, the phase cut of the dimmer determines how much power is available to the dimmer power supply. Consequently, when the load is at its maximum brightness (i.e. latched for a relatively large duration of time during each cycle, a smaller portion of the sine wave is available for charging the power supply in each cycle. Therefore, the power supply is limited by the maximum brightness level for the lamp. Because of this, use of latching power switches that can be triggered by short pulses may be adopted because it reduces the amount of power required by a controller.

The above example situations highlight just some considerations that may be appropriate to consider when determining desired parameters for proper dimmer operation.

FIG. 2 depicts further details of an example two-wire dimmer and operation thereof. In FIG. 2, dimmer 200 receives power from the AC source via phase wire 214 and delivers power to load 202 via load wire 218.

The dimmer includes digital control electronics and code for execution to perform various aspects, including aspects described herein. The digital control electronics and/or code can be implemented via processor(s), microprocessor(s), controller(s), microcontroller(s) (sometimes referred to collectively as "controller", "processor", "computer processor", or "processing circuit"), and the like. In the embodiment of FIG. 2, controller 204 is coupled to one or more user-accessible actuators 206. A user of dimmer 200 is able to engage or otherwise interface with actuator(s) 206 and the controller 204 may receive the command information and interpret this as a command or a set of commands to perform one or more actions for or relating to controlling operation of the dimmer and therefore control the delivery of power to the load 202.

Dimmer 200 can control, for example, the amount of current flowing through load 202 by tailoring the parameters activating TRIAC 208, as described above. TRIAC 208 is a bidirectional three terminal semiconductor device that allows bidirectional current flow when an electrical "control" signal of proper amplitude is applied to its "G" (or gate) terminal via control conductive path 210. TRIAC 208 also has a "C" (or cathode terminal) and an "A" or anode terminal. When an electrical signal is applied to the gate G, TRIAC 208 is said to be gated. When properly gated, current (or another electrical signal) can flow from the "C" terminal to the "A" terminal or from the "A" terminal to the "C" terminal. When TRIAC is not gated or is not properly gated, relatively very little or substantially no current (or no signal) can flow between the "A" and "C" terminals. TRIAC 208 thus acts as an electrically controlled power switch that can allow some or no current flow based on the amplitude of the electrical signal applied to its "G" terminal. Alternatively, the switching component of FIG. 2 (TRIAC 208) could in some examples be implemented as two TRIACs TR1 and TR2, where TRIAC TR1 is controlled by controller 204, which applies a fire signal onto control conductive path 210 to turn on TRIAC TR2, which in turn gates TRIAC TR1 allowing an AC signal to pass through load 202 and back to the AC source via neutral wire 212.

Connected in series to TRIAC 208 is mechanical switch 216. Mechanical switch 216 can be an "air gap switch" that can be activated to stop current flow through the dimmer 200, thus stopping current flow through the load wire 218, load 202 and neutral wire 212. Mechanical switch 216 disconnects power to the dimmer 200 and load 202 to permit servicing and/or replacement of a light bulb, etc. TRIAC 208 can be gated to provide current amounts (e.g. waveform chopping) related to intensities of load 202 (for example intensity of the light if load 202 includes a lighting element, fan speed if light 202 includes a fan, etc.) or can be gated to provide substantially no current, thus essentially switching off load 202.

Power supply 220 is provided to power operation of component(s) of dimmer 200. Power supply may receive power from the phase conductive path 214, in one example. The power supply 220 may power, for instance, operation of controller 204. The controller 204 can be coupled to and communicate with a zero-crossing detector circuit 222. The zero-crossing detector circuit 222 outputs a zero-crossing signal. The controller 204 can use the zero-crossing signal for various timing functions, such as the proper timing of pulses/signals that the controller 204 generates to control TRIAC 208.

Some lighting loads have a characteristic, based on current through the lamp, that the switching circuit (e.g. TRIAC) unlatches during the conduction period of the half-cycle. This causes the zero-crossing signal provided by the zero-crossing detection circuit to generate a false and unstable zero-crossing signal edge potentially much earlier than the actual line zero-crossing. The control signal provided to the switching circuit could indicate a fire signal based on the false edge, leading to problems such as flickering and poor dimming range.

In some implementations, the zero-crossing is indicated using an analog level provided to the dimmer microcontroller and the microcontroller sets a level threshold below which a zero-crossing signal is seen. In aspects presented herein, the zero-crossing signal is provided as a square wave that varies between HI and LOW states.

Figure 3A:
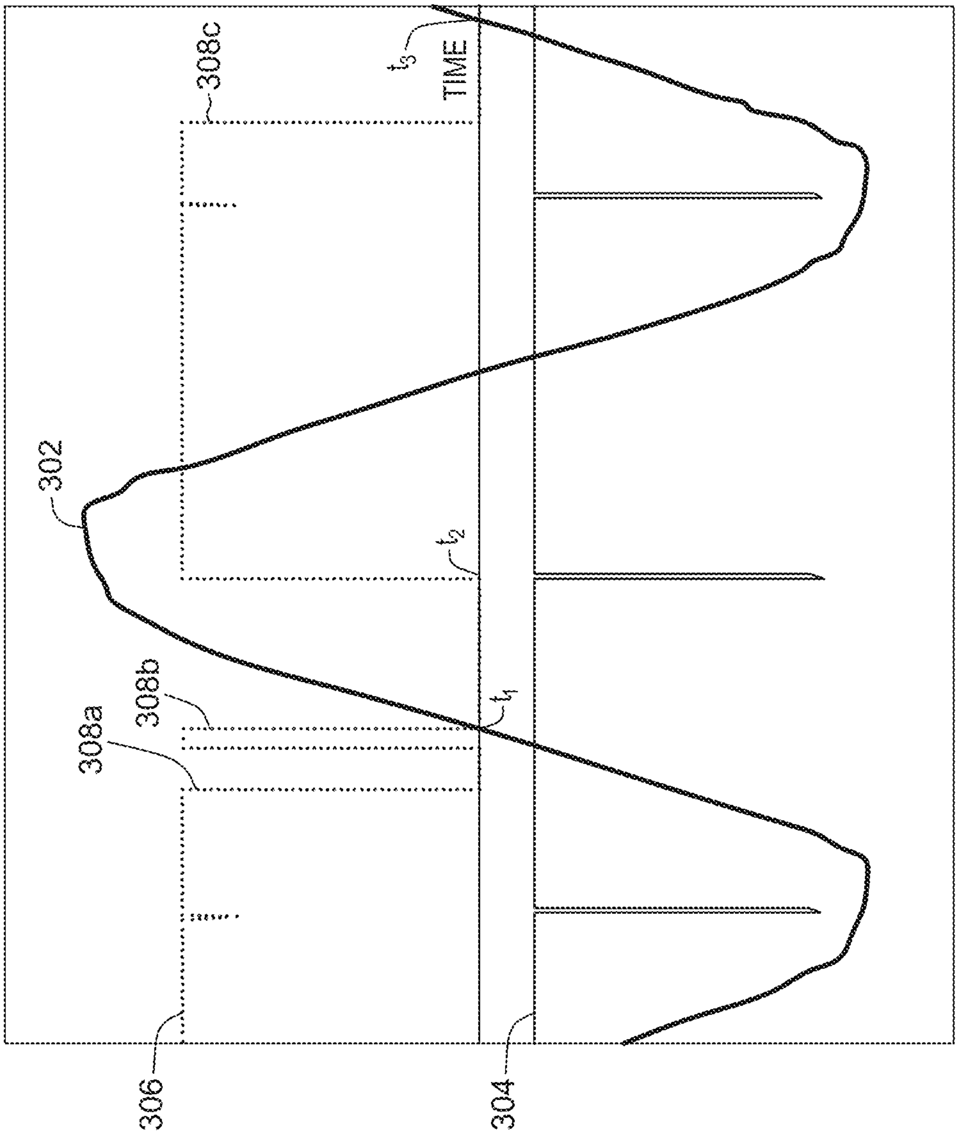
FIGS. 3A and 3B illustrate example issues related to zero-crossing detection.
Figure 3B:
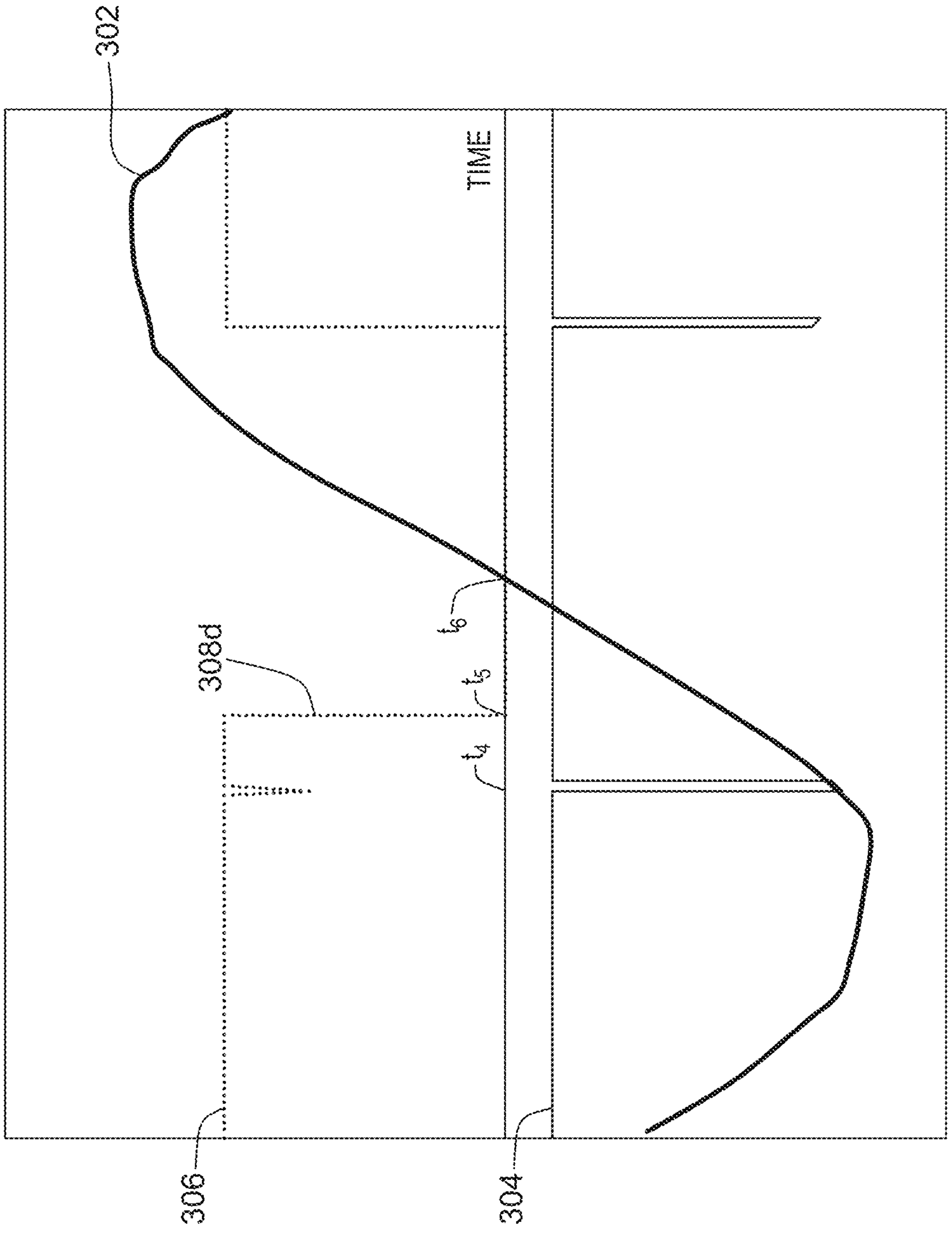

FIGS. 3A and 3B illustrate example issues related to zero-crossing detection. FIG. 3A presents a case in which false and real zero-crossing edges are present in a half cycle before the zero-crossing. FIG. 3B presents a case in which only a false zero-crossing edge (false-positive) is present in the half cycle and there is no zero-crossing edge indicative of the actual zero-crossing of the AC waveform into the next half cycle.

Referring initially to FIG. 3A, AC waveform 302 presents the AC waveform of line voltage, control signal 304 presents the control signal or gate pulse to the switching circuit, the control signal controlling firing/latching of the switching circuit, and zero-crossing signal 306 presents the zero-crossing signal from the zero-crossing detection circuit to the microcontroller (also referred to herein as a controller, microprocessor, processor, or processing circuit) of the dimmer. The three plots show values (y-axis) with respect to time (x-axis). The microcontroller is configured in this example to look for a negative, or falling, edge of the zero-crossing signal. The edge occurs when the zero-crossing signal falls from a HI state to a LOW state (or 1 to 0), and such a transition from HI to LOW indicates, in this example, positive-going zero-crossings of the line voltage, as opposed to negative-going zero-crossings of the line voltage. In this example, negative-going zero-crossings—those transitioning from the positive to the negative half cycles of the full cycles—are ignored.

There are two falling edges (308*a*, 308*b*) of the zero-crossing signal 306 just prior to the occurrence of the first zero-crossing of line voltage 302 at time t1. Time t1 is the time of the actual positive-going zero-crossing of the line voltage. Edge 308*b* is therefore the edge that indicates the true zero-crossing, i.e. the 'real zero-crossing' edge. Edge 308*a* is a false indication of the zero-crossing.

The zero-crossing signal 306 falls low at the zero-crossing (time t1) and stays low for a period of time until time t2 when it goes HI again. Time t2 coincides with the time that the switching circuit is fired by way of the control signal 304, which drops LOW for some amount of time to fire the switching circuit. Firing the switching circuit causes the zero-crossing signal to go HI again, as depicted. The last depicted falling edge 308*c* of the zero-crossing signal 306 is another false zero-crossing indication. In this case, the zero-crossing signal 306 remains low until some time after time t3, the time of the true zero-crossing. Consequently, there is no falling edge of zero-crossing signal 306 at time t3 to indicate the time of this next positive-going zero-crossing. FIG. 3A therefore depicts both a false indication (308*a*) of a true zero-crossing that occurs at time t1, and a non-indication of an actual zero-crossing at time t3. False indications of zero-crossings can be undesirable as they can throw-off the timing of firing the switching circuit and result in jitter.

Referring now to FIG. 3B, again AC waveform 302 presents the AC waveform of line voltage, control signal 304 presents the control signal to the switching circuit, and zero-crossing signal 306 presents the zero-crossing signal from the zero-crossing detection. The control signal 304 fires the switching circuit at time t4 and the zero-crossing signal presents a falling edge 308*d* at time t5 shortly thereafter, falsely indicating a zero-crossing at time t5, which is significantly prior to the actual line voltage zero-crossing at time t6.

Aspects described herein can address both issues presented in the above, i.e. false, premature indications of zero-crossings and non-indicated zero-crossings. In some aspects, a windowing approach is used for zero-crossing indication monitoring. Zero-crossing indications are considered valid only if received within defined 'detection windows' of time (a 'detection window' is also referred to herein as just 'window'). The process can be performed by a controller, microcontroller, microprocessor, or any other processing circuit of a dimmer based on observing that the zero-crossing signal has provided an early zero-crossing indication, for example. The process predetermines a duration of time, or 'window size'. The predetermined duration of time is a length of time for which to deem a zero-crossing indication of the zero-crossing signal provided by a zero-crossing detector circuit a valid zero-crossing indication of an actual zero-crossing of the AC waveform. The predetermines duration of time can be used to select detection windows of time in order to ascertain times of zero-crossings of the AC waveform using the predetermined duration of time. The process selects a detection window of time equal to the predetermined duration of time. The positioning of the window and therefore detection of zero-crossing indications can be set based on when the true zero-crossings are expected. The detection window size can be tailored as desired using the predetermined duration of time. As a specific example, the predetermined duration of time is approximately 1.5 milliseconds. Windowing in this manner can be used to filter-out and ignore false zero-crossing indications (presented by edges of the zero-crossing signal) that occur prior to the start of the detection window, and enable generation of accurate switching circuit firings based on real zero-crossing indication(s) that occur within each window of time.

The process can determine an expected time of a temporally-next zero-crossing of the AC waveform. A selected detection window of time can be selected for a next zero-crossing for which to monitor. The selected detection window extends from a selected first time, corresponding to the window start/open, to a selected second time, corresponding to the window end/close. Additionally, the detection window can straddle (i.e. begin before and end after) the expected time of the next zero-crossing. The detection window has a duration equal to the predetermined duration of time. The selected first time is a point in time from which receipt of an indication of the next zero-crossing is to be deemed a valid zero-crossing indication of the next zero-crossing. Since the zero-crossing is a transition from a first half cycle to a second half cycle of the AC waveform, the detection window can be positioned in time such that the first time (window open) is during the first half cycle and before the expected time of the next zero-crossing. The selected first time can be selected based on the expected time of the next zero-crossing, such that the selected second time, which is equal to the selected first time plus the established duration of time, occurs during the second half cycle, after the expected time of the next zero-crossing. The process can also monitor the zero-crossing signal for a zero-crossing indication, of the next zero-crossing, occurring within the detection window, i.e. at or after the first time and before or at the second time, and ascertain a time of the next zero-crossing based on the monitoring. Once the first zero-crossing indication is received in the window and taken to be the actual zero-crossing time, monitoring for the rest of the window may not be necessary and can cease until opening the next detection window when it is time to monitor for the subsequent zero-crossing. It may, however, be the case that no indication of the next zero-crossing is received in the detection window. Even in this situation, the process can ascertain a time of the next zero-crossing, for instance by assuming the time of the next zero-crossing based on frequency and/or other properties of the AC waveform. In some embodiments, it may be that all zero-crossing indications (even false ones) are being received as input capture by the microprocessor, but the microprocessor, as part of its monitoring, could disregard the zero-crossing indications not falling within the detection monitoring windows. By windowing the zero-crossing detection, false-positives can be avoided and therefore proper timing of the switching circuit firing can be maintained. The process can therefore control a supply of AC power to a load using the ascertained times of the (actual) zero-crossings of the AC waveform in firing the switching circuit of the dimmer to selectively control the switching circuit to conduct the supply of AC power to the load.

Figure 4:
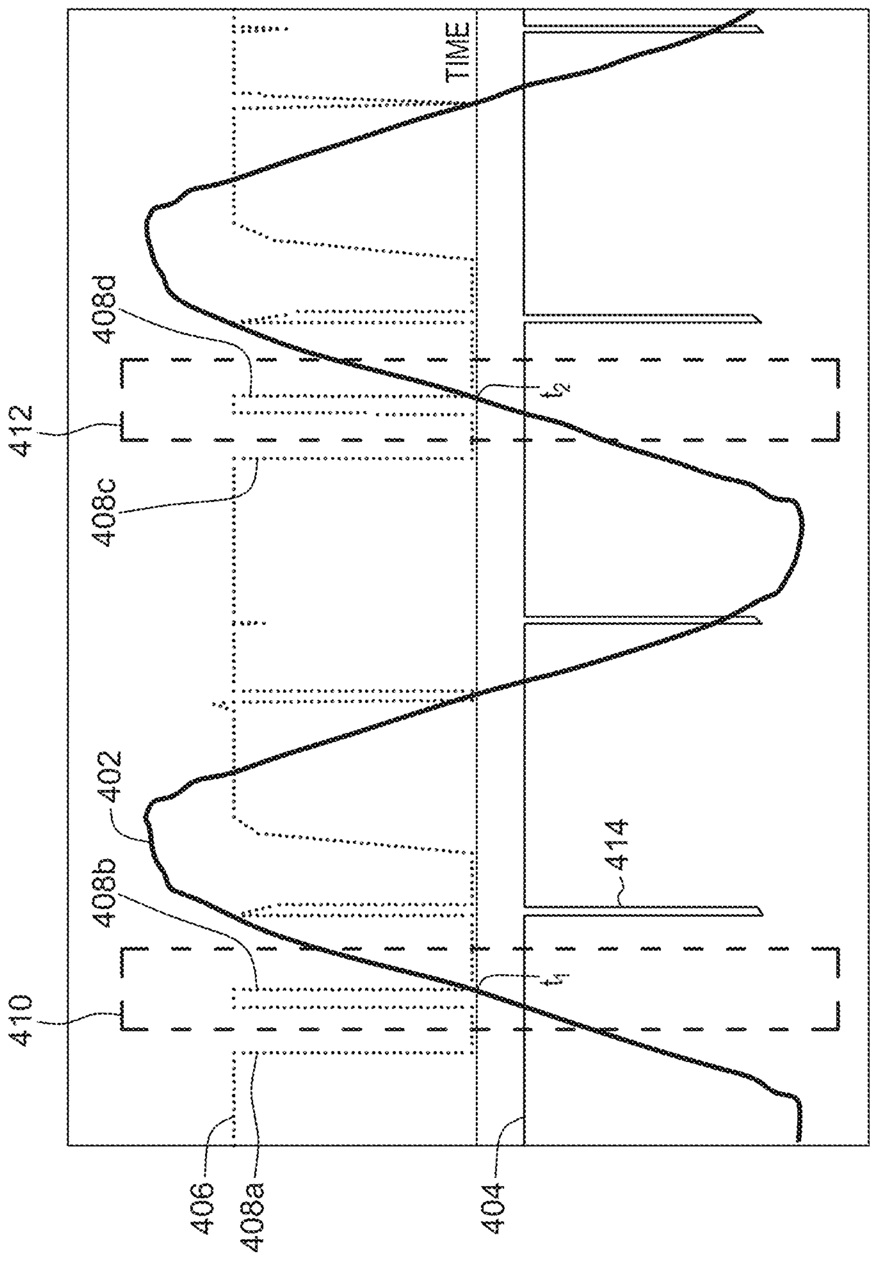
FIG. 4 depicts a waveform plot that illustrates windowing the detection of zero-crossings using a predetermined duration of time, in accordance with aspects described herein.

FIG. 4 depicts a waveform plot that illustrates windowing the detection of zero-crossings using a predetermined duration of time, in accordance with aspects described herein. AC waveform 402 depicts the AC waveform of line voltage, control signal 404 depicts the control signal to the switching circuit, and zero-crossing signal 406 depicts the zero-crossing signal from the zero-crossing detection circuit. Two detection windows, 410 and 412, are depicted for monitoring of the zero-crossings of the two positive-going zero-crossings at times t1 and t2.

Window 410 defines the period of time during which a falling edge of zero-crossing signal 406 is deemed a valid zero-crossing indication. Therefore, the microprocessor can determine to disregard the indication provided by edge 408*a* from purposes of timing the firing of the switching circuit. It may do this on the basis that it is taken as a false indication of a zero-crossing. It may have been indicated due to the switching circuit opening, for example.

Edge 408*b* is the first falling edge of the zero-crossing signal 406 in window 410 and therefore can be taken as a valid zero-crossing indication, i.e. an indication of the true zero-crossing at time t1. In a similar manner for the next zero-crossing at time t2, edge 408*c* can be disregarded and ignored, and edge 408*d*, the first falling edge within window 412, can be deemed a valid indication of the zero-crossing at time t2.

Window duration, first time (window open), and second time (window close) can be programmatically controlled by the microcontroller. The start and end times could be positioned in time based on prior data. For instance, if there has been a series of accurate zero-crossing indications, the period of the waveform can be determined, and this can be used to predict when the next zero-crossing is expected to occur. The position of the window (i.e. start time and end time) can be based around that, such that the windows extends from the first time to the second time and straddles the expected time of the next zero crossing (i.e. the expected time falls within the range between the first time and the second time). The window could be centered on the expected time of the next zero-crossing, or could be shifted earlier or later if desired. The duration of the detection window can be selected/set equal to predetermined duration of time for detection windows under the approach described herein. This duration of time can be predetermined (e.g. prior to selecting the detection window) based at least on a frequency of the waveform. In a particular example, the predetermined duration of time (and therefore the duration of a detection window) is 1.5 milliseconds, and the window opens 1 millisecond before the expected time of the next zero-crossing. The window therefore closes 0.5 milliseconds after the expected time of the next zero-crossing because it is 1.5 milliseconds long. In this manner, the position or anchor point for a window of time can be based on true zero-crossing information from a collection of prior-detected zero-crossings. The predetermined duration can change over time, for instance based on observing a change in waveform frequency, as one example, in which case the changed waveform frequency may be used in re-determining the duration of time, or based on some other parameter that controls the duration of time.

It is noted that the zero-crossing signal 406 goes HI and then LOW again at about the time of the first switching circuit firing 414. This is again an example of an unstable zero-crossing signal. This transition from HI to LOW, which is a falling edge, does not fall within a window 410 or 412, and therefore can be ignored and disregarded as being an indication of a zero-crossing.

In accordance with a windowing approach as described herein, it is possible to monitor for a given true zero-crossing during only a defined window of time, where the monitoring starts at the first time during the first half cycle and ceases at or before the second time during the second half cycle. For instance, it could cease upon, and based on, receiving the zero-crossing indication of the next zero-crossing prior to the second time. This could repeat one or more times, i.e. to monitor for indication(s) of subsequent zero-crossings. Clearly the detection window(s) when monitoring for those subsequent zero-crossings will have different selected first and second times to define these different monitoring windows for the subsequent zero-crossings.

Based on monitoring the zero-crossing signal for the zero-crossing indication of the next zero-crossing, the process can ascertain a time of the next zero-crossing. With respect to one or more indications of the zero-crossing signal that occur during the first half cycle prior to the first time (prior to opening the window to detect that zero-crossing), the ascertaining the zero-crossing can include the microprocessor determining to disregard those one or more indications from purposes of timing the firing of the switching circuit, based on the indications occurring prior to the first time.

When any false zero-crossing indications are observed prior to the first time (at which the window opens) the microprocessor can determine, on the basis of the indications occurring prior to the first time, that voltage sag in voltage of the AC waveform is present. In this regard, the approach could be used to identify when voltage sag occurs.

As noted, the predetermined duration of time for the window duration can be based on a frequency of the AC waveform, and this duration of time can be updated (re-determined) based on observing a change to that frequency of the AC waveform, as one example. A greater frequency may warrant a shorter duration for the window. In particular embodiments, the predetermined duration of time for the window, and therefore the duration of time during which a zero-crossing indication is deemed a valid zero-crossing indication, is between 1.3 milliseconds and 1.7 milliseconds. Additionally or alternative, the predetermined duration may be determined as a fraction of the AC waveform period/full cycle duration, for instance between one-thirteenth and one-tenth of a duration of a full cycle of the AC waveform. In some examples, the first time (window open) is set between 0.8 milliseconds and 1.2 milliseconds prior to the determined expected time of the upcoming zero-crossing, and the selected second time is between 0.3 milliseconds and 0.7 milliseconds after the determined expected time of the next zero-crossing.

The determination of the expected time of the next zero-crossing can use a plurality of times of zero-crossings, of the AC waveform, that occurred prior to the next zero-crossing. For example, a desired statistical function can be applied to detected prior AC waveform periods to ascertain an expected time of the next zero-crossing, e.g. by determining an amount of time to add to a time of a zero-crossing that is sequentially-prior to the next zero-crossing, in order to provide the expected time of the next zero-crossing.

As part of ascertaining the zero-crossings, the process can repeat, for each additional next zero-crossing of a series of additional next zero-crossings of the AC waveform: the selecting a detection window of time, the monitoring the zero-crossing signal for a zero-crossing indication (i.e. of the additional next zero-crossing), and the ascertaining a time (i.e. of the additional next zero-crossing) based on the monitoring.

If, when monitoring for an indication of a particular zero-crossing during a given window no such zero-crossing indication is received, a process can nonetheless assume a time of the zero-crossing (e.g. based on previous zero-crossing information) and generate an appropriate fire signal to the switching circuit. As discussed above, there may be times when an actual zero-crossing occurs but the zero-crossing signal fails to provide a corresponding indication of that zero-crossing. The zero-crossing detector circuit may detect current transition going only in one direction (positive to negative or negative to positive) and there may be no load current transition in the detected half cycle. In accordance with aspects described herein, based on monitoring the zero-crossing signal for a zero-crossing indication that occurs during the window (at or after the first time and before or at the second time), the process can determine that no indication of the next zero-crossing was provided by the zero-crossing signal from that first time, in the first half cycle, to the second time in the second half cycle. In order to ascertain that particular zero-crossing, the process can use the expected time of the next zero-crossing as an assumed time of the next zero-crossing. From this, it can be determined, based on the assumed time of the next zero-crossing, a time to fire the switching circuit of the dimmer (e.g. during the second half cycle) after the assumed time of the zero-crossing. This approach can address the issue noted in FIG. 3B in which no zero-crossing information is provided during the detection window spanning the actual zero-crossing at time t6.

It is possible that the non-indication of a zero-crossing persists for consecutive cycles of the AC waveform. If firing in these cases based only on assumed timings of zero-crossings, this firing can be unreliable. Over time, differences between the assumed and actual zero-crossings can compound, resulting in a significant drift from the timings of the actual zero-crossings. To address this, after an estimated zero-crossing, the control signal pulse duration for firing the switching circuit after (and based on) the assumed zero-crossing time can be widened from a default duration to a longer duration. The dimmer can be configured with a default control signal pulse duration, referring to a default pulse duration of time for a control signal to be held in an ON state to latch the switching circuit to conduct the supply of AC power to the load. Based on monitoring for a zero-crossing during the window and determining that no indication of the next zero-crossing was provided, and based on using the expected time of the next zero-crossing as the assumed time of the zero-crossing, the process can turn the control signal to the ON state at the determined (assumed) time to fire the switching circuit, per usual, but then hold the control signal in the ON state for an extended duration of time that is longer than the default pulse duration. By widening the pulse width, this can keep the zero-crossing information stable and produce a real zero-crossing signal edge for detection on the next zero-crossing at the end of the half cycle.

Figure 5:
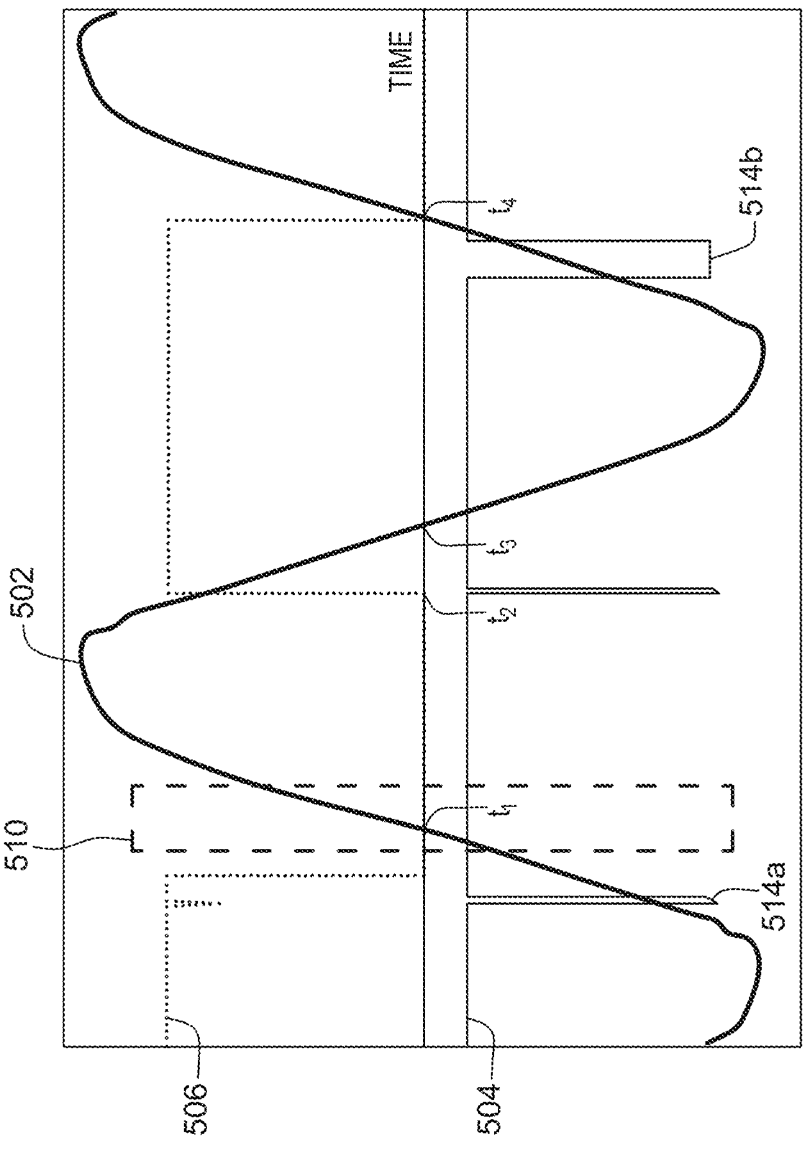
FIG. 5 depicts a waveform plot that illustrates lengthening a default pulse duration to facilitate zero-crossing detection, in accordance with aspects described herein.

FIG. 5 depicts a waveform plot that illustrates lengthening a default pulse duration to facilitate zero-crossing detection, in accordance with aspects described herein. 502 presents the AC waveform of line voltage, 504 presents the control signal to the switching circuit, and 506 presents the zero-crossing signal from the zero-crossing detection. 510 depicts a window for monitoring for the positive-going zero-crossing as time t1.

Pulse 514*a* is the pulse of the control signal 504 to the switching circuit and causes a fire thereof to begin conducting to the load. The ON state of the control signal 504 is LOW in this example and the OFF state is HI. Pulse 514*a*, in which the control signal is held in the ON state, is relatively short. This default duration is, in some examples, 100 microseconds. After firing, a zero-crossing indication can be expected to occur at time t1. Here, no indication of the actual zero-crossing at time t1 is seen in window 510, as the zero-crossing signal 506 does not fall LOW during that window of time. Based on this, and in accordance with aspects discussed herein, the zero-crossing is assumed to have occurred at an assumed time, for instance a time based on the timing of prior zero-crossing indications of this AC waveform, for instance the expected time of the zero-crossing.

The switching circuit is fired for the conduction period during that positive half cycle based on the assumed timing of the zero-crossing that actually occurred at time t1. The zero-crossing signal 506 goes high at time t2 when the switching circuit is fired for the conduction period during that positive half cycle. In this example, no window is positioned to detect the zero-crossing at time t3 because the negative-going zero-crossings are not monitored—for in this example. If an indication of a zero-crossing was provided on the negative-going zero-crossing, it may be ignored. Alternatively, some embodiments might monitor for zero-crossings at half cycle intervals.

In any case, the next zero-crossing of interest is the one at time t4, the next positive-going transition. The control signal pulse 514*b* is widened to an extended duration of time that exceeds the default, which is 100 microseconds in this example. The control signal is held in the ON state, e.g. to keep the switching circuit latched for at least the duration of the widened pulse. The pulse is released prior to the anticipated time of the zero-crossing at time t4. By holding the gate pulse, this keeps the zero-crossing signal from falling LOW while the gate pulse is held prior to the true zero-crossing at time t4, and can eliminate a false zero-crossing edge that might occur due to the switching circuit unlatching (i.e. a problem highlighted above).

The extended duration of time can terminate some predefined amount of time prior to an end of the half cycle. This may be done to avoid holding the gate of the switching circuit into the next half cycle. In some embodiments, the extended duration of time is less than or equal to 1.8 milliseconds, and the default control signal pulse duration is between 50 and 200 microseconds. Additionally or alternatively, the extended duration of time can be configured to last, at a maximum, an amount of time corresponding to 26 degrees out of the 360 degrees in a full cycle of the AC waveform. Additionally or alternatively, the extended duration of time and default pulse duration may be calculated as fractions of a period (full cycle) of the AC waveform, for instance the extended duration of time may be less than or equal to one-tenth of a duration of a full cycle of the AC waveform, and the default pulse duration can be between three-thousandths and twelve-thousandths of the duration of the full cycle, as examples.

In embodiments, the extended pulse width approach is utilized when the fire time of the switching circuit in a half cycle is greater than 1 millisecond prior to the end of the half cycle.

Another issue observed at the input/output of some dimmers connected to a load is line sag (or "droop) when that dimmer is operating on the same electrical branch as one or more other dimmers. Line sag can cause the switching circuit of a dimmer to unlatch regardless of the particular load that the dimmer is controlling. Line sag can be problematic because it causes the voltage across the load to decrease. As a result, current through the load can fall below the switching circuit holding current, causing a switching circuit unlatch event and failure of the switching circuit to close again because the current is too low. The resulting change in brightness can be undesirable. Strobing could also result at certain firing angles when the switching circuit is at an edge of latching and unlatching. Strobing may be considered a more intense version of flickering, though they are sometimes referred to interchangeably. In any case, in scenarios when the switching circuit is at an edge of latching and unlatching, there is a line voltage dependency on this effect. If the sag happens at the edges of the line input voltage, it will cause the TRIAC to unlatch because the sag pulls-down the voltage to (or close to) zero. But if the sag happens in the relative middle of the input voltage, the voltage sag may not be enough to unlatch the TRIAC in one half-cycle but may be enough to do so in the next half-cycle. The foregoing issues can occur on a significant number of light emitting diode (LED) lamps in particular.

Figure 6:
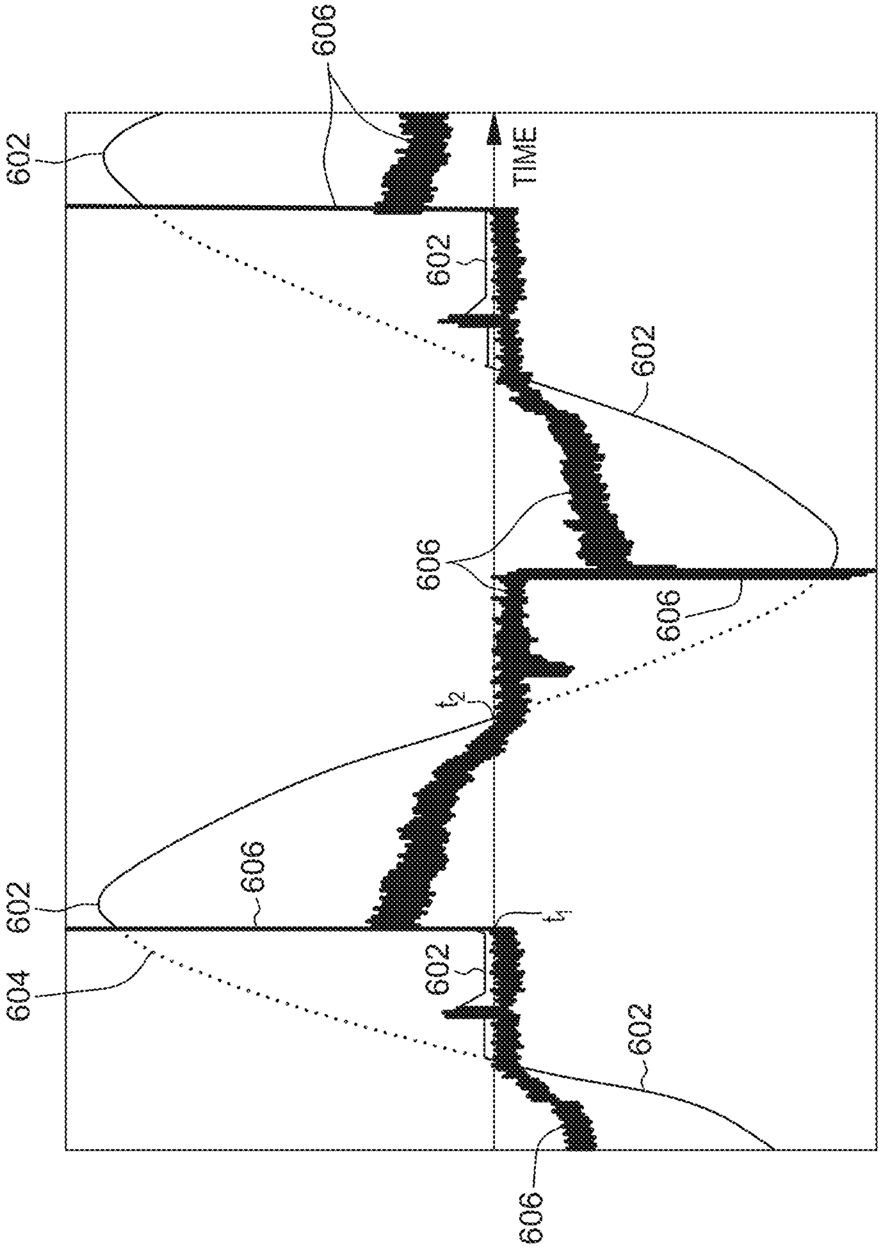
FIG. 6 depicts a waveform plot of a normal operating scenario in firing a switching circuit.

FIG. 6 depicts a waveform plot of a normal operating scenario in firing a switching circuit. In FIG. 6, the thin sold line 602 is the load voltage (output voltage) waveform, the dotted line 604 is line voltage, and the thick solid line 606 is current through the load. In this scenario, there are two dimmers on the same electrical branch and the plots of FIG. 6 correspond to one of those dimmers. The other dimmer is off in this scenario so the unlatch problem described above is not present. The dimmer performs normally in this normal operating scenario, in that the plots are as expected. When the switching circuit is fired at time t1, 606 (current through the load) spikes and the dimmer conducts AC power to the load until the zero-crossing at time t2. This repeats for the following two half cycles depicted in FIG. 6. Output voltage 602 coincides with line voltage during the conduction periods when the switching circuit is latched.

Figure 7:
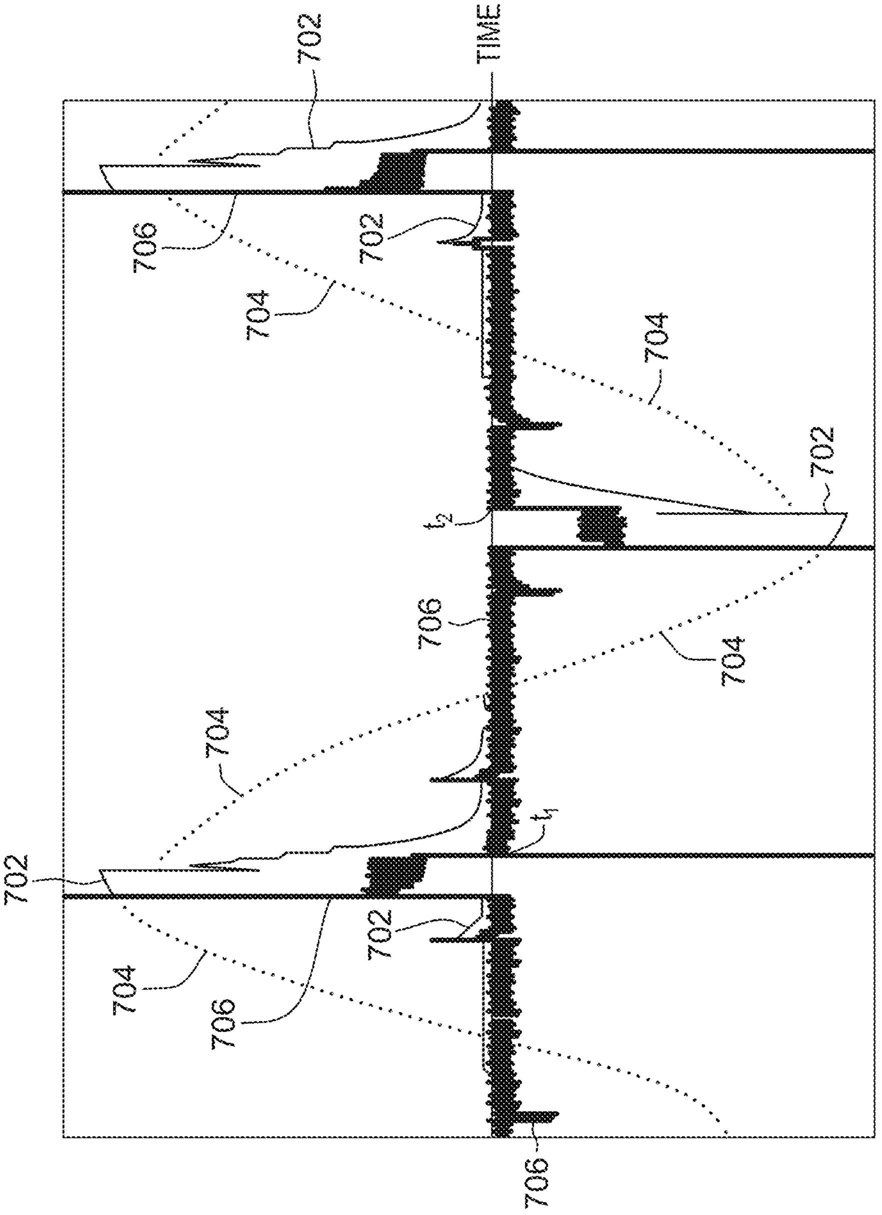
FIG. 7 depicts a waveform plot in which a sag in line voltage is presented at one dimmer based on firing a switching circuit of another dimmer.

FIG. 7 depicts a waveform plot in which a sag in line voltage is presented at one dimmer based on firing a switching circuit of another dimmer. In FIG. 7, again the thin sold line 702 is the load voltage (output voltage) waveform, the dotted line 704 is line voltage, and the thick solid line 706 is current through the load. This scenario is the same as that of FIG. 6 except that here the second dimmer is activated and firing to control brightness of its associated load. As a result, the problem discussed above is presented with the first dimmer. Line sag in line voltage 704 is observed at times t1 and t2 coinciding with firing of the second dimmer. Because line voltage dropped at those times, the switching circuit of the first dimmer stops conducting, current through the load at those times drops to zero and output voltage 702 collapses to zero.

FIG. 7 illustrates unintended behavior in that there is a lack of normal conduction through the end of each conduction cycle, causing the load being controlled by the first dimmer to get noticeably dimmer and possibly resulting in strobing effects if the switching circuit unlatches in one half cycle and remains properly latched in the other half cycle.

Figure 8:
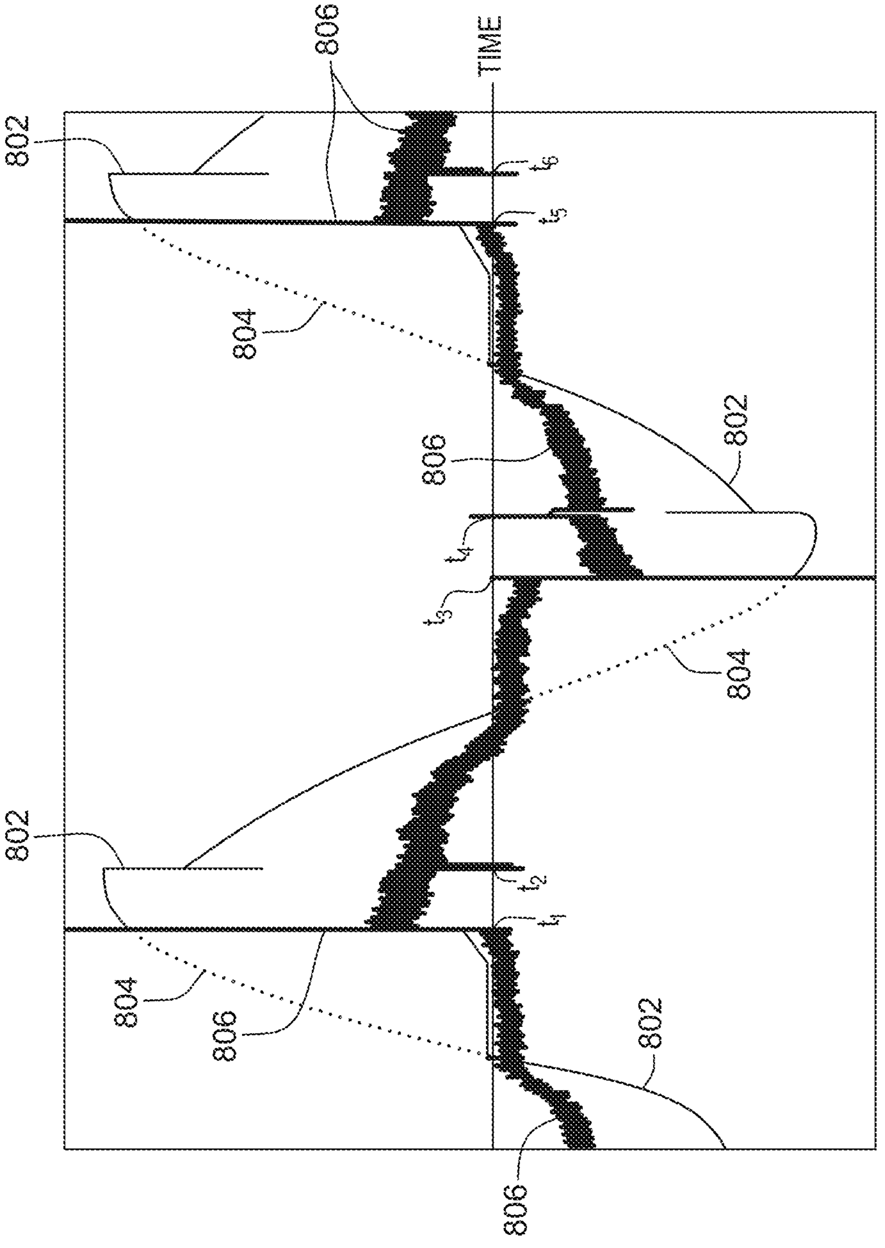
FIG. 8 depicts a waveform plot showing an example approach to address line voltage sag.

FIG. 8 depicts a waveform plot showing an example approach to address line voltage sag. In FIG. 8, again the thin sold line 802 is the load voltage (output voltage) waveform, the dotted line 804 is line voltage, and the thick solid line 806 is current through the load. The first dimmer (to which the plot in this figure corresponds) fires at times t1, t3 and 5. The second dimmer fires at times t2, t4 and t6. At those times, a pull-down or sag appears in line voltage 802 and current 806. Current falls to zero, which would be expected to unlatch the switching circuit until the next firing. However, in accordance with aspects described herein, the control signal to the switching circuit can be held in the ON state to cause the switching circuit to re-latch and conduct for the remainder of the half cycle. Conduction is maintained, the current through the load is reestablished, and hence the current is recovered at times t2, t4 and t6 as depicted.

In accordance with aspects described herein the control signal is selectively held in the ON state for varying amounts of time depending on, e.g., a firing angle at which to fire the switching circuit. Line sag and current collapse at a relatively low conduction angle has a smaller impact on brightness due to a smaller amount of current 'lost' after a switching circuit unlatch event. Line sag at a sufficiently low conduction angle will unlatch the switching circuit and the circuit will not re-latch on account that voltage is too low to recover the latch based on characteristics of the switching circuit. A temporary line sag at a higher conduction angle than the firing angle is not expected to have an impact because the switching circuit is unlatched at the point of the line sag.

Figure 9:
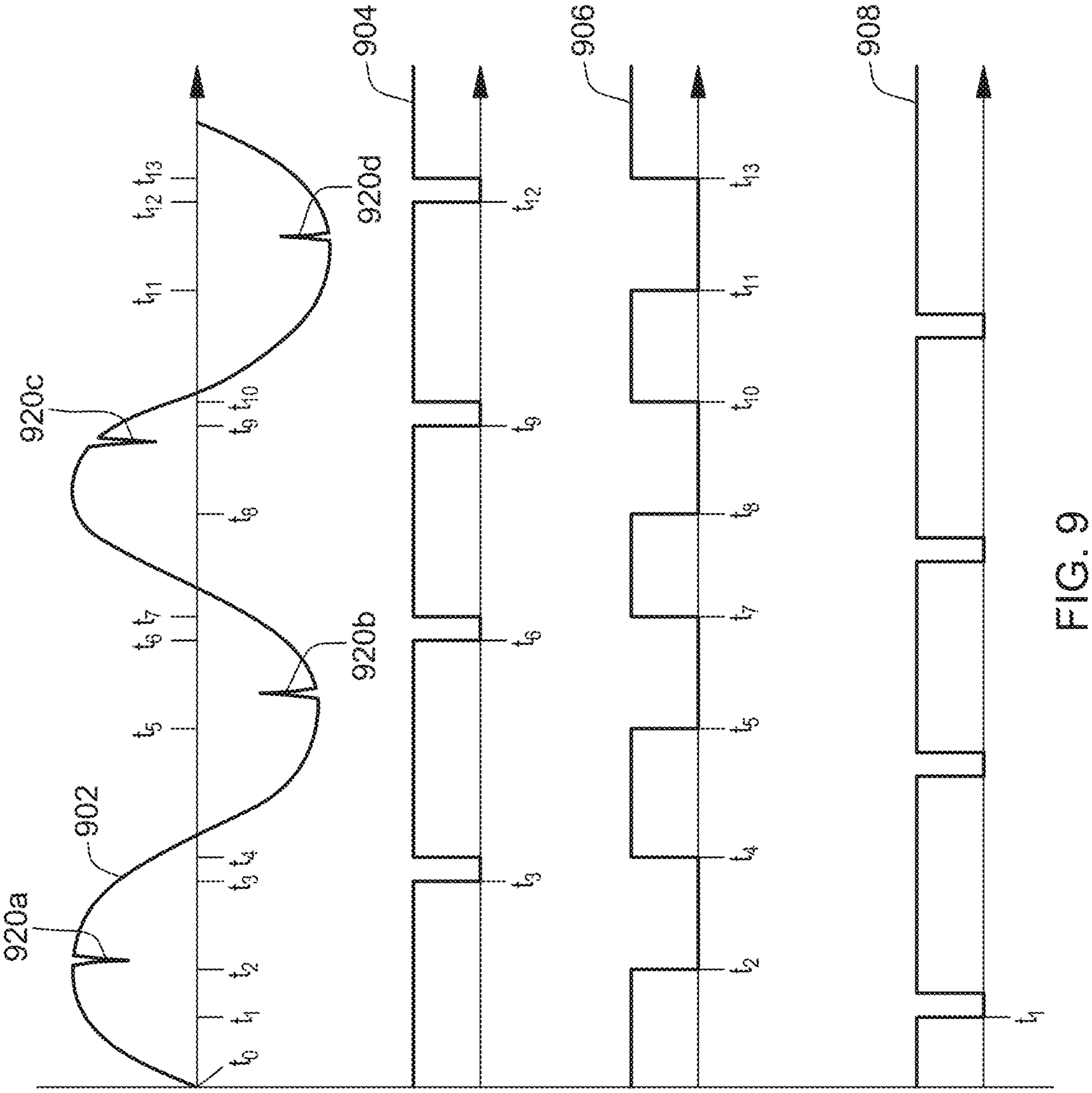
FIG. 9 depicts a timing diagram illustrating example electrical load control to address line voltage sag, in accordance with aspects described herein.

FIG. 9 depicts a timing diagram illustrating example electrical load control to address line voltage sag, in accordance with aspects described herein. FIG. 9 illustrates varying the pulse width of the control signal depending on what the desired conduction/firing angle, which is a function of the dimming level setpoint of the dimmer. Thus, an example process initially determines, based on a desired brightness level setting of the dimmer, a firing angle of the AC waveform, the firing angle being a point at which to fire a switching circuit of the dimmer to selectively control the switching circuit to conduct a supply of AC power to the load. The firing angle corresponds to a firing delay time, after zero-crossings of the AC waveform, at which to fire the switching circuit. The process then selects a control signal pulse (or 'gate pulse') duration, which is a duration of time for the control signal to be held in the ON state to latch the switching circuit to conduct the supply of AC power to the load. In examples depicted herein, the ON state is when the control signal is LOW.

Selecting the control signal pulse duration includes selecting between two possibilities based on the determined firing angle. The first possible duration is a fixed or default duration of time that begins at the firing delay time and ends after lapse of the fixed duration of time. An example fixed duration is 100 microseconds. The second possible duration is a variable duration of time in that it begins at the firing delay time and ends at some preset unlatch time of the AC waveform. The preset unlatch time is a fixed amount of time prior to the end (anticipated or estimated) of each half cycle in which the switch is to be fired. Based on whatever control pulse duration is selected, the process then controls the supply of AC power to the load, in which the dimmer holds the control signal in the ON state for the selected control signal pulse duration in its selective control of the switching circuit to conduct the supply of AC power to the load.

Based on the firing delay time being outside of some range, for instance being less than a first threshold delay or greater than a second threshold delay that is greater than the first threshold delay, the selection between the fixed and variable duration selects the fixed duration of time. An example such first threshold can correlate to a set, sufficiently-high brightness setting, for instance 60 degrees into the half cycle, or ⅓ of the duration of the half cycle. As examples, the first threshold delay can be between 2.3 and 3.3 milliseconds, for instance.

An example second threshold can correlate to a set, sufficiently-low brightness setting, for instance 110 degrees into the half cycle, or 60 to 62% of the duration of the half cycle. As an example, the second threshold is between 5.0 and 6.0 milliseconds for example line frequencies.

Turning to FIG. 9, 902 represents the line input AC waveform. The line input experiences sag 920*a*, 920*b*, 920*c* and 920*d* in each of the four half cycles depicted.

904 depicts the control signal in a first embodiment in which the dimming level is set relatively low, for instance less than 60 degrees from the end of the half cycle. Assume the firing delay time (extending from t0 to t3 in the first half cycle) is greater than the second threshold in this example. Then, the selected control signal pulse duration is the fixed duration. Example second threshold delay times are between 5.0 milliseconds and 6.0 milliseconds (inclusive). Example fixed durations for which to hold the control signal in the ON state range from 50 microseconds to 1 millisecond (inclusive). The control pulse remains in the ON state for the fixed duration of time and transitions to the OFF state prior to the negative-going zero-crossing after the first half cycle, as depicted. This repeats with control signal pulses beginning at times t6, 19 and t12 in the following three half cycles.

The line sag at points 920*a*, 920*b*, 920*c* and 920*d* in this example occur prior to the firing time in each of the half cycles and therefore does not affect performance of the dimmer. Even if the sag were experienced much later in the half cycle, the second threshold may be set late enough in the half cycle that if line sag were experienced during the fixed-duration gate pulse, the effect of the sag and failure to re-latch could be relatively insignificant.

Based on the firing delay time being equal to or greater than the first threshold delay time and less than or equal to a second threshold delay time, the selected control signal pulse duration can be the variable duration of time. The duration is variable in the sense that it starts at the appropriate firing delay time and ends at a fixed, unvarying, preset unlatch time during the half cycle. In other words, the pulse may be held until the preset time regardless of when the pulse was started. Though in some approaches the preset unlatch time could be set as close to the end of the half cycle as possible, this would require more power than unlatching at an earlier time and could result in collapse of the power supply. Therefore, it may be preferred to set the preset unlatch time at a conservatively longer duration of time prior to the end of the half cycle. Overall dimming range would be affected but this can be an appropriate tradeoff.

In a particular example, the interval of the first threshold delay to the second threshold delay extends from 110 degrees to 60 degrees from the end of the half cycle. When the firing delay time falls in this interval, the control signal pulse duration can range from, e.g., 100 microseconds to 2.5 milliseconds, depending on the frequency of the AC waveform and the dimmer brightness setting. In some embodiments, the variable duration of time is therefore between 100 microseconds and 2.5 milliseconds. The upper limit (2.5 milliseconds here) can depend on the time of the upper (first) threshold minus the lower (second) threshold, in cases where the fixed, preset time to which to hold the variable duration control pulse matches the second threshold delay time.

Control signal 906 depicts the control signal in a second embodiment in which the dimming level is set such that the firing delay time is within the range between the first and second threshold delay times, inclusive. Here, the firing delay time is time t2 in the first half cycle. Assuming time t2 is in the range between the first and second thresholds. The control signal is therefore held from time t2 until the fixed, preset unlatch time, which is time t4 in this example. This is repeated in the second, third, and fourth half cycles, in which the control signal is fired at times t5, 8 and t11, respectively, and is held until times t7, t10 and t13, respectively. As a result, the control signal is held in the ON state during the sag at points 920*a*, 920*b*, 920*c*, 920*d*.

At firing delay times smaller than the first threshold, e.g. relatively high brightness settings, for instance above 110 degrees from the end of the half cycle, the control signal pulse duration can be selected as the fixed duration of time, for instance between 50 microseconds and 1 millisecond, as an example. Control signal 908 depicts the control signal in a third embodiment in which the dimming level is set such that the firing delay time is less than the first threshold delay time. Here, the firing delay time is equal to time t1 in the first half cycle and the control pulse is held in the ON state for the fixed duration of time. This repeats in the second, third, and fourth half cycles, in which the control pulse duration is selected to be the fixed duration of time.

It is noted that in these examples, the first threshold would be greater than time t1 and the second threshold would be less than time t3.

Aspects can therefore provide a wider control signal pulse depending on the dimmer set point. In some cases, this approach is implemented all of the time when the dimmer is on, though in other cases it is implemented only after line sag has been detected. In this regard, a process could detect a voltage sag in the AC waveform and proceed to perform the above-described selection of the control signal pulse duration based on detecting that voltage sag. For at least some time prior to detecting that voltage sag, the dimmer can be configured to hold the control signal in the ON state for the fixed duration of time regardless of the determined firing angle.

The process of selecting the control signal pulse duration can repeat when the firing angle changes. Based on a user or other entity (for instance another electronic device, an automated process, etc.) changing the desired brightness level setting to be a different brightness level, the process can repeat the selection of the appropriate control signal pulse duration and proceed to control the supply of AC power to the load based on the newly selected control signal pulse duration.

An alternative approach to that described above could instead be provided. When the firing delay time is less than a first threshold delay, the load may be at or near maximum brightness. At this point, if there is no voltage sag that has been detected, the dimmer fires with the fixed pulse duration. If instead there is a voltage sag detected, then as described the sag can cause the switching circuit to unlatch, leading to the bulb losing brightness and/or displaying strobing effects. This can be addressed in an embodiment in which if voltage sag is detected at or near maximum brightness (firing delay time less than first threshold delay), the firing pulse duration is selected to extend either from the firing delay time to the second threshold delay (Option 1) or from the first threshold delay to the second threshold delay (Option 2). Option 2 may be preferred in two-wire situations where there may be constraints on the power supply usage, while option 1 may be preferred in situations (such as three-wire applications) where power consumption is less of a concern. Both options can eliminate adverse effects of line sag.

Referring to FIG. 9, assume that time t1 is the firing delay time, time t2 is the first threshold delay, time t3 is the second threshold delay, and line sag (e.g. 920*a*) is detected between time to and time t1 (or perhaps in prior half-cycles). Under Option 1 above, the control signal pulse duration extends from, and the pulse is help ON from, time t1 until time t3. Under Option 2 above, the control signal pulse duration extends from, and the pulse is held ON from, time t2 to time t3.

Accordingly, in an example method of operating an electrical load controller, the method includes based on the desired load level setting of the electrical load controller, determining the firing angle at which to fire the switching circuit, detecting whether a voltage sag is present in the AC waveform, and selecting a control signal pulse duration between: (i) a fixed duration of time that begins at the firing delay time and ends after the fixed duration of time; and (ii) a variable duration of time, where the selecting is based further on determining that the firing delay time is less than a first threshold delay, and on the detecting whether the voltage sag is present in the AC waveform. Based on detecting that voltage sag is not present in the AC waveform, the selecting the control signal pulse duration selects the fixed duration of time. However, based on detecting that the voltage sag is present in the AC waveform, the selecting selects the variable duration of time, where the variable duration of time ends at a present unlatch time of the AC waveform, such as the second threshold delay. The variable duration of time begins at the firing delay time (Option 1) or the first threshold delay (Option 2).

Figure 10:
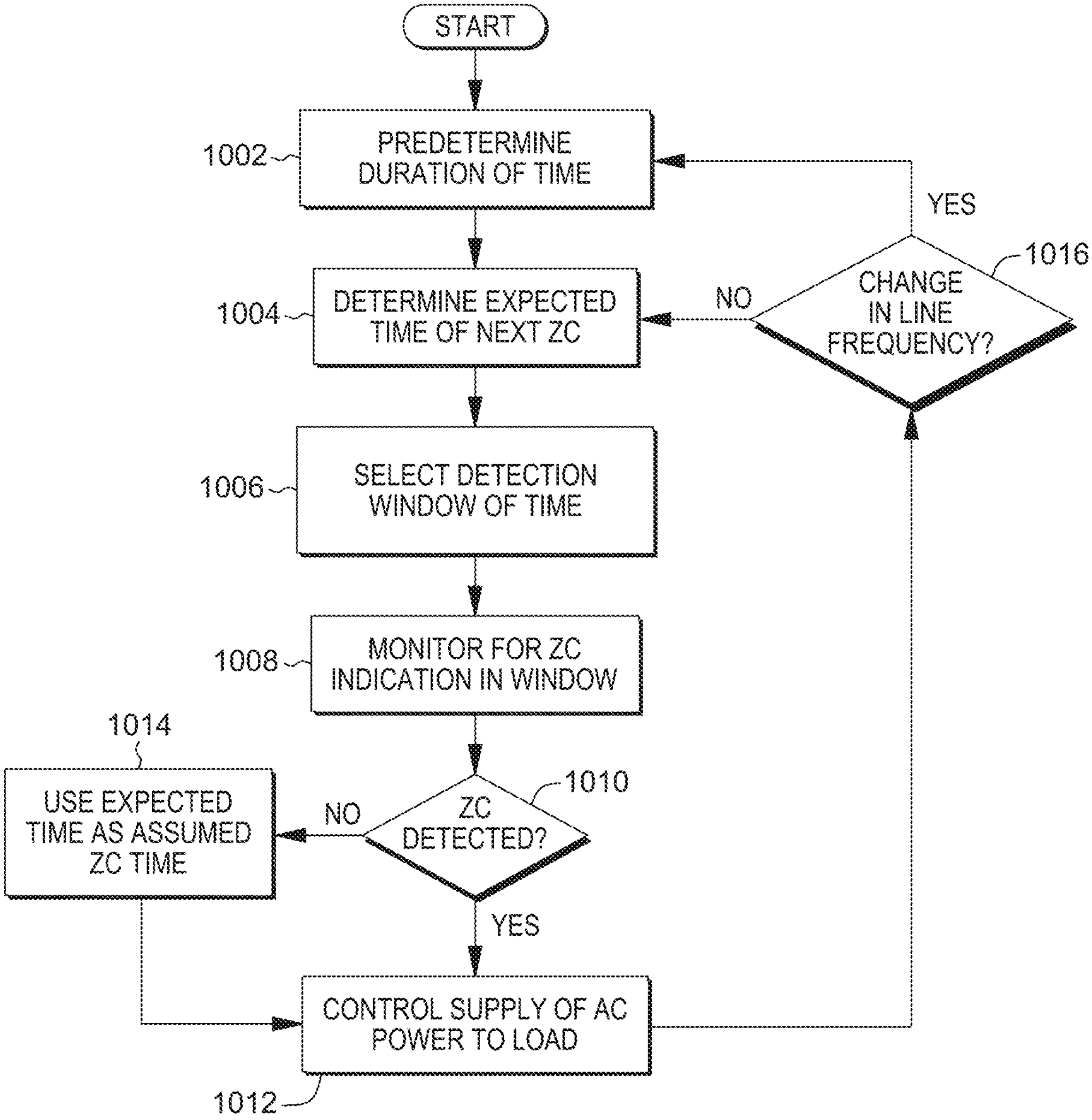
FIG. 10 depicts an example process for prediction and recovery of zero-crossing information in a dimmer, in accordance with aspects described herein.
Figure 11:
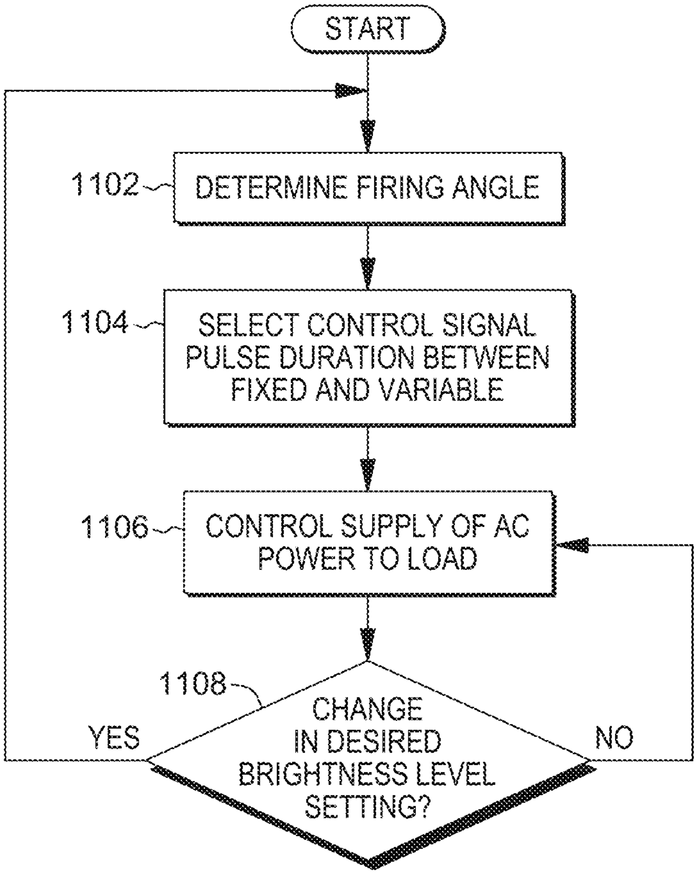
FIG. 11 depicts an example process for improved switching in line sag conditions, in accordance with aspects described herein.

FIGS. 10-11 depict examples processes described herein. The processes can be performed by one or more apparatuses, such as a dimmer or other electrical load controller (or component thereof, such as a microprocessor, controller, etc.) as described herein. The electrical load controller can be for controlling conduction of a supply of power to an electrical load, such as a lighting load. The electrical load controller can include a line input terminal (or any conductive component) and a load output terminal (or any conductive component), the line input terminal configured to be electrically coupled to a supply of alternating current (AC) power, and the load output terminal configured to be electrically coupled to a load. The electrical load controller can further include a switching circuit electrically coupled in series between the line input terminal and the load output terminal, the switching circuit having an ON state in which the switching circuit conducts the supple of AC power to the load and an OFF state in which the switching circuit does not conduct the supply of AC power to the load, and the switching circuit can be configured to be selectively controlled by varying a control signal to the switching circuit between the ON state and the OFF state.

In particular, FIG. 10 depicts an example process for prediction and recovery of zero-crossing information in a dimmer, in accordance with aspects described herein. The process predetermines (1002) a duration of time. The predetermined time is, for instance, an amount of time allotted for a detection window during which to deem a zero-crossing indication (of a zero-crossing signal provided by a zero-crossing detector circuit of the dimmer) as being a valid zero-crossing indication of an actual zero-crossing of an alternating current (AC) waveform. The alternating current (AC) waveform oscillates though full cycles, each full cycle comprising a positive half cycle and a negative half cycle of the AC waveform. The predetermined duration of time is based at least in part on a frequency of the AC waveform. The established duration of time is between 1.3 milliseconds and 1.7 milliseconds (inclusive), and/or between one-thirteenth and one-tenth of a duration of a full cycle of the AC waveform, for instance.

In some examples, the windowed zero-crossing detection (FIG. 10) is begun on the basis of observing false or early zero-crossing indications. The process can therefore include predetermining the duration of time based on observing that the zero-crossing signal has provided an early zero-crossing indication.

The process can ascertain times of zero-crossings of the AC waveform. This ascertaining can use the predetermined duration of time in monitoring for the times of the zero-crossings, for instance by selecting detection windows of time for which to monitor for the zero-crossings. Thus, as part of the ascertaining, the process determines (1004) an expected time of a next zero-crossing of the AC waveform, referring to the temporally-next zero-crossing from the current time. The next zero-crossing is a point of transition of the AC waveform from a first half cycle to a second half cycle of the AC waveform. The determining (1004) the expected time of the next zero-crossing can use and be based on a plurality of times of zero-crossings of the AC waveform that occurred prior to the next zero-crossing. A statistical function, such as an averaging, of detected prior wave periods could be applied to the prior zero-crossings, for example, and it can be determined therefrom an amount of time to add to a time of a zero-crossing that is sequentially-prior to the next zero-crossing to inform/provide the expected time of the next zero-crossing. An average period of the AC waveform could be added to the time of the sequentially-previous zero-crossing, for example.

The process then selects (1006) a detection window of time. The window of time may be a specific instantiation of the predetermined duration of time, equal in duration to the predetermined duration of time. The window has a specific start time and a specific end time that is the predetermined duration of time after the start time. Thus, the window of time extends from a selected first time, corresponding to the window start/open, to a selected second time, corresponding to the window end/close, and has a duration equal to the predetermined duration of time. The first time is a point in time from which receipt of an indication of the next zero-crossing is to be deemed a valid zero-crossing indication of the next zero-crossing. The first time is during the first half cycle and before the expected time of the next zero-crossing, and is selected based on the expected time of the next zero-crossing such that the second time, which is equal to the first time plus the established duration of time, occurs during the second half cycle, after the expected time of the next zero-crossing. In this regard, the detection window straddles the expected time of the next zero-crossing.

In particular examples, the selected first time is between 0.8 milliseconds and 1.2 milliseconds prior to the determined expected time of the next zero-crossing, and/or the selected second time is between 0.3 milliseconds and 0.7 milliseconds after the determined expected time of the next zero-crossing.

Once the window of time is selected, the process continues by monitoring (1008) the zero-crossing signal for a zero-crossing indication, of the next zero-crossing, occurring within the selected detection window, i.e. at or after the first time and before or at the second time. In this regard, the monitoring could cease once the first zero-crossing indication in the window is detected. The monitoring could start at the first time during the first half cycle and cease upon receiving the zero-crossing indication of the next zero-crossing, i.e. prior to the close of the window, i.e. the second time. Consequently, it is not necessarily the case that the monitoring continues for the entirety of the window of time. Additionally, in some examples an input capture feature of the dimmer could receive all zero-crossing indications (and possibly even those outside of the window) but disregard the indications other than the first in each window. Ascertaining the zero-crossings of interest could then include determining, with respect to one or more zero-crossing indication(s) of the zero-crossing signal that occur during the first half cycle prior to the first time, to disregard the one or more zero-crossing indications from purposes of timing the firing of the switching circuit, based on the indications occurring prior to the first time. Even though these may be disregarded, the process could determine, on the basis of any zero-crossing indication(s) occurring during the first half cycle prior to the first time, the presence of a voltage sag in voltage of the AC waveform. On the basis of voltage sag, this could invoke other processing in accordance with aspects described herein, for instance processing discussed with reference to FIG. 11.

The process of FIG. 10 continues by ascertaining a time of the next zero-crossing based on the monitoring. This includes initially determining (1010) whether an indication of the next zero-crossing was provided by the zero-crossing signal during the window, i.e. from the first time to the second time. If so (1010, Y), the process ascertains the time of this indication as being the time of that next zero-crossing, and will use this in controlling (1012) a supply of AC power to a load. Otherwise, if no indication of the next zero-crossing was provided by the zero-crossing signal from the first time to the second time (1010, N), then the ascertaining the time of that next zero-crossing based on the monitoring uses (1014) the expected time of the next zero-crossing as an assumed time of the next zero-crossing, and determines, based on the assumed time of the next zero-crossing, a time to fire the switching circuit of the dimmer during the second half cycle.

The dimmer can be configured with a default pulse duration (i.e. control signal pulse duration), which is a default duration of time for a control signal to be held in an ON state to latch the switching circuit (and, e.g., conduct the supply of AC power to the load). Based on the monitoring (1008) on determining that no indication of the next zero-crossing was provided (1010, N) the expected time of the next zero-crossing can be used as an assumed time of the zero-crossing, and this in turn can inform an assumed time to fire the switching circuit (e.g. as some delay time, based on the dimmer set level, past the assumed zero-crossing time) in the half-cycle after the zero-crossing. The process could lengthen the pulse duration to longer than the default, i.e. turning the control signal to the ON state at the assumed time to fire the switching circuit and holding the control signal in the ON state for an extended duration of time that is longer than the default pulse duration. In particular embodiments, the extended duration of time is less than or equal to 1.8 milliseconds, and the default control signal pulse duration is between 50 and 200 microseconds. Additionally or alternatively, the extended duration of time can be less than or equal to one-tenth of a duration of a full cycle of the AC waveform, and the default pulse duration can be between three-thousandths and twelve-thousandths of the duration of the full cycle. The extended duration of time can terminate some predefined amount of time prior to an end of the second half cycle. In this regard, the control pulse can have an upper limit so as not to reach a threshold proximity to the end of the conduction cycle, for instance to avoid holding the gate of the switching circuit. Based on holding the control signal in the ON state for the extended duration of time, the switching circuit can re-latch after unlatching at some time after the determined time to fire and prior to lapse of the extended duration of time. This is an example effect that lengthening the control pulse duration has on the latching of the switching circuit.

Regardless of whether the true zero-crossing time was detected during the window (1010, Y) or, instead, the expected time of the zero-crossing is used (1010, N), the process continues by selectively controlling (1012) a supply of AC power to a load using that ascertained time of the zero-crossing of the AC waveform to fire a switching circuit of the dimmer, for instance to selectively control the switching circuit to conduct the supply of AC power to the load.

Aspects of the process of FIG. 10 can be repeated continually to determine the time of other zero-crossings. The ascertaining of the times of these additional next zero-crossings repeats, for each additional next zero-crossing of a plurality of additional next zero-crossings of the AC waveform, the selecting a detection window of time (1006), the monitoring the zero-crossing signal for a zero-crossing indication (e.g. of the additional next zero-crossing) (1008), and the ascertaining a time of the additional next zero-crossing based on the monitoring.

In FIG. 10, the process loops back from the controlling step 1012. In this example, the process proceeds from 1012 to a determination (1016) whether there is a change in line frequency. If so (1016, Y), the window duration may need to be changed, i.e. the process can return to 1002 to update the predetermined duration of time based on observing the change to the frequency of the AC waveform. Then, or if it was determined at 1016 that there was no significant change in line frequency (1016, N), the process proceeds to 1004 and continues.

In another example process for prediction and recovery of zero-crossing information in a dimmer in accordance with aspects described herein, specifically in operating an electrical load controller, the process includes selecting a detection window of time that extends for a predetermined duration of time established based on a frequency of an alternating current (AC) waveform. The selected detection window extends from a selected first time to a selected second time, the selected first time being a point in time from which receipt of an indication of a next zero-crossing of the AC waveform is to be deemed a valid zero-crossing indication of the next zero-crossing, the next zero-crossing being a point of transition of the AC waveform from a first half cycle to a second half cycle of the AC waveform, the AC waveform oscillating though full cycles, each full cycle comprising a positive half cycle and a negative half cycle of the AC waveform. The selected first time is during the first half cycle and before an expected time of the next zero-crossing, and is selected based on the expected time of the next zero-crossing such that the second time, which is equal to the first time plus the duration of time, occurs during the second half cycle, after the expected time of the next zero-crossing. The process also includes using a microprocessor to receive a zero-crossing signal provided by a zero-crossing detector circuit of the electrical load controller during the selected detection window and ascertain a time of the next zero-crossing occurring during that selected detection window at or after the first time and before or at the second time. Additionally, the process includes controlling a supply of AC power to a load, where the controlling uses the ascertained time of the next zero-crossing in firing a switching circuit of the electrical load controller to selectively control the switching circuit to conduct the supply of AC power to the load. Additional aspects described herein (for instance with respect to FIG. 10 and elsewhere herein) can apply to this process for operating an electrical load controller.

FIG. 11 depicts an example process for improved switching in line sag conditions, in accordance with aspects described herein. Based on a desired brightness level setting of a dimmer (or other electrical load controller), the process determines (1102) a firing angle, of an alternating current (AC) waveform, at which to fire a switching circuit of the dimmer to selectively control the switching circuit to conduct a supply of AC power to a load. The firing angle corresponds to a firing delay time, after zero-crossings of the AC waveform, at which to fire the switching circuit.

The process selects (1104) a control signal pulse duration, which is a duration of time for a control signal to be held in an ON state to latch the switching circuit to conduct the supply of AC power to the load. The selecting the control signal pulse duration includes selecting, for the control signal pulse duration, and based on the determined firing angle, between: (i) a fixed duration of time that begins at the firing delay time and ends after the fixed duration of time, and (ii) a variable duration of time that begins at the firing delay time and ends at a preset unlatch time of the AC waveform. The fixed duration of time is between 50 and 1 millisecond (inclusive) in some examples. The variable duration of time is between 100 microseconds and 2.5 milliseconds, (inclusive) in some examples.

Based on the firing delay time being (i) less than a first threshold delay or (ii) greater than a second threshold delay (which is greater than the first threshold delay), the selecting (1104) the control signal pulse duration selects the fixed duration of time. Based on the firing delay time being equal to or greater than the first threshold delay and less than or equal to the second threshold delay, the selecting the control signal pulse duration selects the variable duration of time. In this manner, the variable duration is used when the switching circuit fire is to occur between the first and second threshold delay (inclusive), and the fixed duration of time is used outside of that range.

The first threshold delay can be between 2.3 milliseconds and 3.3 milliseconds (inclusive) and/or the second threshold delay can be between 5.0 milliseconds and 6.0 milliseconds (inclusive) in particular examples.

The process proceeds after selecting the pulse duration to controlling (1106) the supply of AC power to the load based on the selected control signal pulse duration. The controlling holds the control signal in the ON state for the selected control signal pulse duration in selectively controlling the switching circuit to conduct the supply of AC power to the load.

In general the selected duration is used on an ongoing basis for each half cycle in which to fire. At some point, a user or other entity (for instance another electronic device, an automated process, etc.) might change the desired brightness level setting, which changes the firing angle. The process of FIG. 11 can determine (1108) whether there is a change in the desired brightness level setting. If not (1108, N), the process returns to 1006 and continues controlling the supply of AC power to the load using the currently selected control signal pulse duration. Otherwise, based on a change in the desired brightness level setting to a different brightness level (1108, Y), the process returns to 1102 where it determines the new firing angle. It then repeats the selecting a control signal pulse duration (1104) using the new firing angle, and the controlling the supply of AC power to the load based on the selected control signal pulse duration (1106). It is noted that the selecting between the durations, when repeated for the new firing angle, may or may not actually change what was selected previously; it depends on where the new firing angle falls relative to the thresholds.

As an enhancement, a process could also include detecting a voltage sag in the AC waveform and invoke processing of FIG. 11. The selection of the pulse duration (1104) could be performed based on detecting the voltage sag. Optionally, for at least some time prior to detecting the voltage sag, the dimmer could be configured to hold the control signal in the ON state for the fixed duration of time regardless of the determined firing angle.

Although various examples are provided, variations are possible without departing from a spirit of the claimed aspects.

Figure 12:
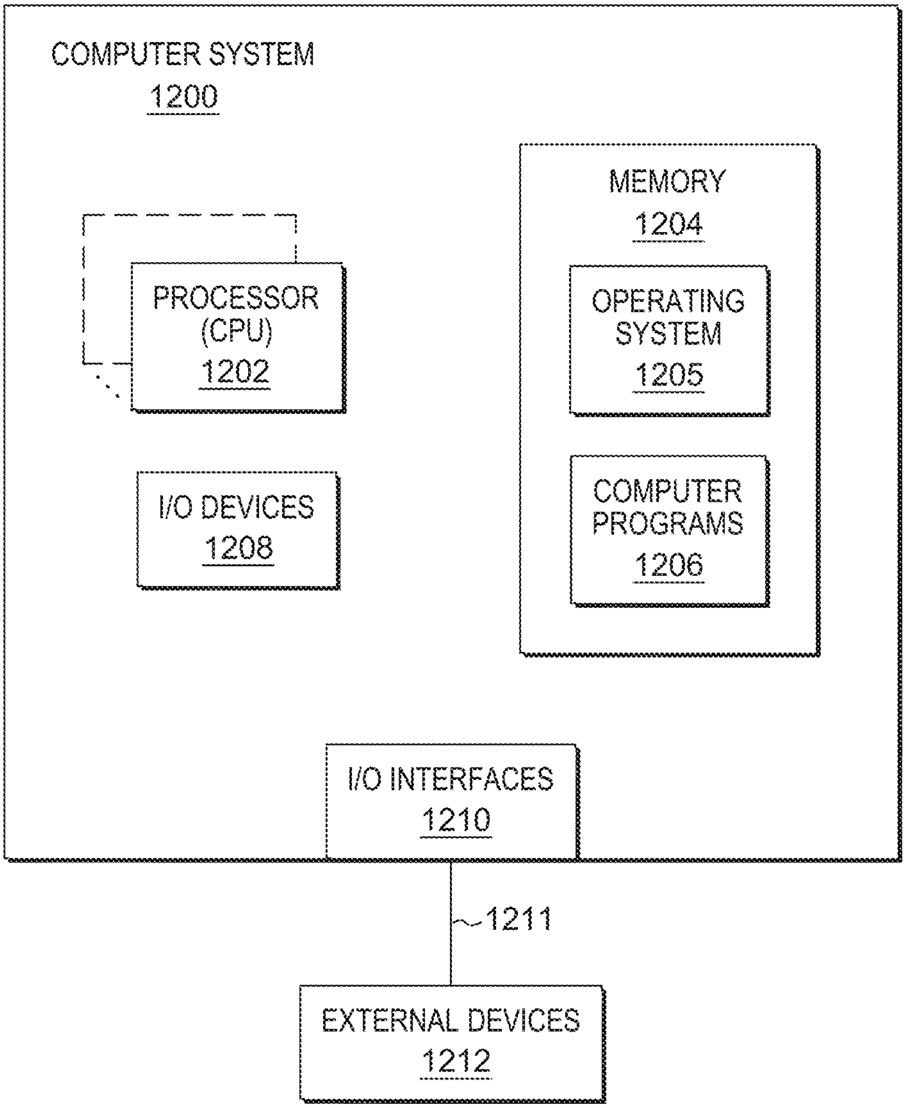
FIG. 12 depicts one example of a computer system and associated devices to incorporate and/or use aspects described herein.

Systems described herein, including those referred to herein as dimmers or electrical load controllers, may be regarded in some respects as a computer system capable of executing program instructions to perform processes/methods. Thus, processes as described herein may be performed by one or more computer systems, such as those described herein, which may include one or more dimmers, dimming systems, electrical load controllers, and/or one or more computer systems of or connected thereto, such as one or more cloud servers, one or more user personal computers such as a smartphone, tablet, or other device, and/or one or more other computer systems. FIG. 12 depicts one example of a computer system and associated devices to incorporate and/or use aspects described herein. A computer system may also be referred to herein as a data processing device/system, computing device/system/node, or simply a computer. The computer system may be based on one or more of various system architectures and/or instruction set architectures.

FIG. 12 shows a computer system 1200 in communication with external device(s) 1212. Computer system 1200 includes one or more processor(s) 1202, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 1202 can also include register(s) to be used by one or more of the functional components. Computer system 1200 also includes memory 1204, input/output (I/O) devices 1208, and I/O interfaces 1210, which may be coupled to processor(s) 1202 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 1204 can be or include main or system memory (e.g. Random Access Memory) used in the execution of program instructions, storage device(s) such as hard drive (s), flash media, or optical media as examples, and/or cache memory, as examples. Memory 1204 can include, for instance, a cache, such as a shared cache, which may be coupled to local caches (examples include L1 cache, L2 cache, etc.) of processor(s) 1202. Additionally, memory 1204 may be or include at least one computer program product having a set (e.g., at least one) of program modules, instructions, code or the like that is/are configured to carry out functions of embodiments described herein when executed by one or more processors.

Memory 1204 can store an operating system 1205 and other computer programs 1206, such as one or more computer programs/applications that execute to perform aspects described herein. Specifically, programs/applications can include computer readable program instructions that may be configured to carry out functions of embodiments of aspects described herein.

Examples of I/O devices 1208 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (1212) coupled to the computer system through one or more I/O interfaces 1210.

Computer system 1200 may communicate with one or more external devices 1212 via one or more I/O interfaces 1210. Example external devices include a keyboard, a pointing device, a display, and/or any other devices that enable a user to interact with computer system 1200. Other example external devices include any device that enables computer system 1200 to communicate with one or more other computing systems or peripheral devices such as a printer. A network interface/adapter is an example I/O interface that enables computer system 1200 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 1210 and external devices 1212 can occur across wired and/or wireless communications link(s) 1211, such as Ethernet-based wired or wireless connections. Example wireless connections include cellular, Wi-Fi, Bluetooth®, proximity-based, near-field, or other types of wireless connections. More generally, communications link(s) 1211 may be any appropriate wireless and/or wired communication link(s) for communicating data.

Particular external device(s) 1212 may include one or more data storage devices, which may store one or more programs, one or more computer readable program instructions, and/or data, etc. Computer system 1200 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 1200 may be operational with numerous other general purpose or special purpose computing system environments or configurations. Computer system 1200 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Embodiments of the present disclosure may be a system, a method, and/or a computer program product, any of which may be configured to perform or facilitate aspects described herein.

In some embodiments, aspects of the present disclosure may take the form of a computer program product, which may be embodied as computer readable medium(s). A computer readable medium may be a tangible storage device/medium having computer readable program code/instructions stored thereon. Example computer readable medium(s) include, but are not limited to, electronic, magnetic, optical, or semiconductor storage devices or systems, or any combination of the foregoing. Example embodiments of a computer readable medium include a hard drive or other mass-storage device, an electrical connection having wires, random access memory (RAM), read-only memory (ROM), erasable-programmable read-only memory such as EPROM or flash memory, an optical fiber, a portable computer disk/diskette, such as a compact disc read-only memory (CD-ROM) or Digital Versatile Disc (DVD), an optical storage device, a magnetic storage device, or any combination of the foregoing. The computer readable medium may be readable by a processor, processing unit, or the like, to obtain data (e.g. instructions) from the medium for execution. In a particular example, a computer program product is or includes one or more computer readable media that includes/stores computer readable program code to provide and facilitate one or more aspects described herein.

As noted, program instruction contained or stored in/on a computer readable medium can be obtained and executed by any of various suitable components such as a processor of a computer system to cause the computer system to behave and function in a particular manner. Such program instructions for carrying out operations to perform, achieve, or facilitate aspects described herein may be written in, or compiled from code written in, any desired programming language. In some embodiments, such programming language includes object-oriented and/or procedural programming languages such as C, C++, C#, Java, etc.

Program code can include one or more program instructions obtained for execution by one or more processors. Computer program instructions may be provided to one or more processors of, e.g., one or more computer systems, to produce a machine, such that the program instructions, when executed by the one or more processors, perform, achieve, or facilitate aspects of the present disclosure, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

Although various embodiments are described above, these are only examples. For example, computing environments of other architectures can be used to incorporate and use one or more embodiments.

Provided is a small sampling of embodiments of the present disclosure, as described herein:

A1. A method of operating an electrical load controller, the method comprising: predetermining a duration of time based at least in part on a frequency of an alternating current (AC) waveform, the alternating current (AC) waveform oscillating though full cycles, each full cycle comprising a positive half cycle and a negative half cycle; selecting a detection window of time equal in duration to the predetermined duration of time, the selected detection window extending from a selected first time to a selected second time and straddling an expected time of a next zero-crossing of the AC waveform; monitoring a zero-crossing signal for a zero-crossing indication, of the next zero-crossing, occurring within the selected detection window; ascertaining a time of the next zero-crossing based on the monitoring; and selectively controlling a supply of AC power to a load, wherein the controlling uses the ascertained time of the next zero-crossing of the AC waveform to fire a switching circuit of the electrical load controller.

A2. The method of A1, wherein the monitoring for the zero-crossing indication of the next zero-crossing starts at the first time and ceases upon receiving the zero-crossing indication of the next zero-crossing prior to the second time.

A3. The method of A1, wherein the first time is during a first half cycle of the AC waveform, and wherein the method further comprises determining, with respect to one or more zero-crossing indications of the zero-crossing signal that occur during the first half cycle and prior to the first time, to disregard the one or more zero-crossing indications from purposes of timing the firing of the switching circuit, based on the indications occurring prior to the first time.

A4. The method of A3, further comprising determining, based on any zero-crossing indications occurring during the first half cycle prior to the first time, presence of a voltage sag in voltage of the AC waveform.

A5. The method of A1, wherein the predetermined duration of time is between 1.3 milliseconds and 1.7 milliseconds.

A6. The method of A1, wherein the predetermined duration of time is between one-thirteenth and one-tenth of a duration of a full cycle of the AC waveform.

A7. The method of A1, wherein the first time is between 0.8 milliseconds and 1.2 milliseconds prior to the expected time of the next zero-crossing, and wherein the second time is between 0.3 milliseconds and 0.7 milliseconds after the expected time of the next zero-crossing.

A8. The method of A1, further comprising determining the expected time of the next zero-crossing based on a plurality of times of zero-crossings, of the AC waveform, that occurred prior to the next zero-crossing.

A9. The method of A8, wherein determining the expected time applies a statistical function to the plurality of times and determines therefrom an amount of time to add to a time of a zero-crossing that is sequentially-prior to the next zero-crossing to provide the expected time of the next zero-crossing.

A10. The method of A1, wherein based on the monitoring determining that no indication of the next zero-crossing was provided by the zero-crossing signal from the first time to the second time, the ascertaining comprises: using the expected time of the next zero-crossing as an assumed time of the next zero-crossing; and determining, based on the assumed time of the next zero-crossing, an assumed time to fire the switching circuit after the assumed time of the next zero-crossing.

A11. The method of A10, wherein the electrical load controller is configured with a default pulse duration, the default pulse duration being a duration of time for a control signal to be held in an ON state to latch the switching circuit, and wherein, based on the monitoring, if no indication of the next zero-crossing was provided, the method further comprises turning the control signal to the ON state at the assumed time to fire the switching circuit and holding the control signal in the ON state for an extended duration of time that is longer than the default pulse duration.

A12. The method of A11, wherein the extended duration of time is less than or equal to 1.8 milliseconds, and wherein the default control signal pulse duration is between 50 and 200 microseconds.

A13. The method of A11, wherein the extended duration of time is less than or equal to one-tenth of a duration of a full cycle of the AC waveform, and wherein the default pulse duration is between three-thousandths and twelve-thousandths of the duration of the full cycle.

A14. The method of A1, wherein the predetermining the duration of time is performed based on observing that the zero-crossing signal has provided an early zero-crossing indication.

A15. The method of A1, further comprising repeating, for each additional next zero-crossing of a plurality of additional next zero-crossings of the AC waveform, the selecting a detection window of time, the monitoring the zero-crossing signal for a zero-crossing indication of the additional next zero-crossing, and the ascertaining a time of the additional next zero-crossing based on the monitoring.

A16. The method of A1, further comprising repeating the predetermining the duration of time based on observing a change to the frequency of the AC waveform.

A17. An electrical load controller for controlling conduction of a supply of alternating current (AC) power to a load, the electrical load controller comprising: a line input terminal and a load output terminal, the line input terminal configured to be electrically coupled to the supply of AC power, and the load output terminal configured to be electrically coupled to the load; a switching circuit electrically coupled in series between the line input terminal and the load output terminal, the switching circuit having an ON state in which the switching circuit conducts the supply of AC power to the load, and an OFF state in which the switching circuit does not conduct the supply of AC power to the load, the switching circuit configured to be selectively controlled by varying a control signal to the switching circuit between the ON state and the OFF state; and a controller configured to perform: predetermining a duration of time based at least in part on a frequency of an alternating current (AC) waveform, the alternating current (AC) waveform oscillating though full cycles, each full cycle comprising a positive half cycle and a negative half cycle; selecting a detection window of time equal in duration to the predetermined duration of time, the selected detection window extending from a selected first time to a selected second time and straddling an expected time of a next zero-crossing of the AC waveform; monitoring a zero-crossing signal for a zero-crossing indication, of the next zero-crossing, occurring within the selected detection window; ascertaining a time of the next zero-crossing based on the monitoring; and selectively controlling a supply of AC power to a load, wherein the controlling uses the ascertained time of the next zero-crossing of the AC waveform to fire a switching circuit of the electrical load controller.

A18. The electrical load controller of A17, wherein the monitoring for the zero-crossing indication of the next zero-crossing starts at the first time and ceases upon receiving the zero-crossing indication of the next zero-crossing prior to the second time.

A19. The electrical load controller of A17, wherein the first time is during a first half cycle of the AC waveform, and wherein the controller is further configured to perform determining, with respect to one or more zero-crossing indications of the zero-crossing signal that occur during the first half cycle and prior to the first time, to disregard the one or more zero-crossing indications from purposes of timing the firing of the switching circuit, based on the indications occurring prior to the first time.

A20. The electrical load controller of A19, wherein the controller is further configured to perform determining, based on any zero-crossing indications occurring during the first half cycle prior to the first time, presence of a voltage sag in voltage of the AC waveform.

A21. The electrical load controller of A17, wherein the predetermined duration of time is between 1.3 milliseconds and 1.7 milliseconds.

A22. The electrical load controller of A17, wherein the predetermined duration of time is between one-thirteenth and one-tenth of a duration of a full cycle of the AC waveform.

A23. The electrical load controller of A17, wherein the first time is between 0.8 milliseconds and 1.2 milliseconds prior to the expected time of the next zero-crossing, and wherein the second time is between 0.3 milliseconds and 0.7 milliseconds after the expected time of the next zero-crossing.

A24. The electrical load controller of A17, wherein the controller is further configured to perform determining the expected time of the next zero-crossing based on a plurality of times of zero-crossings, of the AC waveform, that occurred prior to the next zero-crossing.

A25. The electrical load controller of A24, wherein determining the expected time applies a statistical function to the plurality of times and determines therefrom an amount of time to add to a time of a zero-crossing that is sequentially-prior to the next zero-crossing to provide the expected time of the next zero-crossing.

A26. The electrical load controller of A17, wherein based on the monitoring determining that no indication of the next zero-crossing was provided by the zero-crossing signal from the first time to the second time, the ascertaining comprises: using the expected time of the next zero-crossing as an assumed time of the next zero-crossing; and determining, based on the assumed time of the next zero-crossing, an assumed time to fire the switching circuit after the assumed time of the next zero-crossing.

A27. The electrical load controller of A26, wherein the electrical load controller is configured with a default pulse duration, the default pulse duration being a duration of time for a control signal to be held in an ON state to latch the switching circuit, and wherein, based on the monitoring, if no indication of the next zero-crossing was provided, the controller is further configured to perform turning the control signal to the ON state at the assumed time to fire the switching circuit and holding the control signal in the ON state for an extended duration of time that is longer than the default pulse duration.

A28. The electrical load controller of A27, wherein the extended duration of time is less than or equal to 1.8 milliseconds, and wherein the default control signal pulse duration is between 50 and 200 microseconds.

A29. The electrical load controller of A27, wherein the extended duration of time is less than or equal to one-tenth of a duration of a full cycle of the AC waveform, and wherein the default pulse duration is between three-thousandths and twelve-thousandths of the duration of the full cycle.

A30. The electrical load controller of A17, wherein the predetermining the duration of time is performed based on observing that the zero-crossing signal has provided an early zero-crossing indication.

A31. The electrical load controller of A17, wherein the controller is further configured to perform repeating, for each additional next zero-crossing of a plurality of additional next zero-crossings of the AC waveform, the selecting a detection window of time, the monitoring the zero-crossing signal for a zero-crossing indication of the additional next zero-crossing, and the ascertaining a time of the additional next zero-crossing based on the monitoring.

A32. The electrical load controller of A17, wherein the controller is further configured to perform repeating the predetermining the duration of time based on observing a change to the frequency of the AC waveform.

A33. A computer program product for operating an electrical load controller, the computer program product comprising: a computer readable storage medium readable by a processing circuit and storing instructions for execution by the processing circuit to perform a method comprising: predetermining a duration of time based at least in part on a frequency of an alternating current (AC) waveform, the alternating current (AC) waveform oscillating though full cycles, each full cycle comprising a positive half cycle and a negative half cycle; selecting a detection window of time equal in duration to the predetermined duration of time, the selected detection window extending from a selected first time to a selected second time and straddling an expected time of a next zero-crossing of the AC waveform; monitoring a zero-crossing signal for a zero-crossing indication, of the next zero-crossing, occurring within the selected detection window; ascertaining a time of the next zero-crossing based on the monitoring; and selectively controlling a supply of AC power to a load, wherein the controlling uses the ascertained time of the next zero-crossing of the AC waveform to fire a switching circuit of the electrical load controller.

A34. The computer program product of A33, wherein the monitoring for the zero-crossing indication of the next zero-crossing starts at the first time and ceases upon receiving the zero-crossing indication of the next zero-crossing prior to the second time.

A35. The computer program product of A33, wherein the first time is during a first half cycle of the AC waveform, and wherein the method further comprises determining, with respect to one or more zero-crossing indications of the zero-crossing signal that occur during the first half cycle and prior to the first time, to disregard the one or more zero-crossing indications from purposes of timing the firing of the switching circuit, based on the indications occurring prior to the first time.

A36. The computer program product of A35, wherein the method further comprises determining, based on any zero-crossing indications occurring during the first half cycle prior to the first time, presence of a voltage sag in voltage of the AC waveform.

A37. The computer program product of A33, wherein the predetermined duration of time is between 1.3 milliseconds and 1.7 milliseconds.

A38. The computer program product of A33, wherein the predetermined duration of time is between one-thirteenth and one-tenth of a duration of a full cycle of the AC waveform.

A39. The computer program product of A33, wherein the first time is between 0.8 milliseconds and 1.2 milliseconds prior to the expected time of the next zero-crossing, and wherein the second time is between 0.3 milliseconds and 0.7 milliseconds after the expected time of the next zero-crossing.

A40. The computer program product of A33, wherein the method further comprises determining the expected time of the next zero-crossing based on a plurality of times of zero-crossings, of the AC waveform, that occurred prior to the next zero-crossing.

A41. The computer program product of A40, wherein determining the expected time applies a statistical function to the plurality of times and determines therefrom an amount of time to add to a time of a zero-crossing that is sequentially-prior to the next zero-crossing to provide the expected time of the next zero-crossing.

A42. The computer program product of A33, wherein based on the monitoring determining that no indication of the next zero-crossing was provided by the zero-crossing signal from the first time to the second time, the ascertaining comprises: using the expected time of the next zero-crossing as an assumed time of the next zero-crossing; and determining, based on the assumed time of the next zero-crossing, an assumed time to fire the switching circuit after the assumed time of the next zero-crossing.

A43. The computer program product of A42, wherein the electrical load controller is configured with a default pulse duration, the default pulse duration being a duration of time for a control signal to be held in an ON state to latch the switching circuit, and wherein, based on the monitoring, if no indication of the next zero-crossing was provided, the method further comprises turning the control signal to the ON state at the assumed time to fire the switching circuit and holding the control signal in the ON state for an extended duration of time that is longer than the default pulse duration.

A44. The computer program product of A43, wherein the extended duration of time is less than or equal to 1.8 milliseconds, and wherein the default control signal pulse duration is between 50 and 200 microseconds.

A45. The computer program product of A43, wherein the extended duration of time is less than or equal to one-tenth of a duration of a full cycle of the AC waveform, and wherein the default pulse duration is between three-thousandths and twelve-thousandths of the duration of the full cycle.

A46. The computer program product of A33, wherein the predetermining the duration of time is performed based on observing that the zero-crossing signal has provided an early zero-crossing indication.

A47. The computer program product of A33, wherein the method further comprises repeating, for each additional next zero-crossing of a plurality of additional next zero-crossings of the AC waveform, the selecting a detection window of time, the monitoring the zero-crossing signal for a zero-crossing indication of the additional next zero-crossing, and the ascertaining a time of the additional next zero-crossing based on the monitoring.

A48. The computer program product of A33, further comprising repeating the predetermining the duration of time based on observing a change to the frequency of the AC waveform.

B1. A method of operating an electrical load controller, the method comprising: based on a desired load level setting of the electrical load controller, determining a firing angle, of an alternating current (AC) waveform, at which to fire a switching circuit of the electrical load controller to selectively control the switching circuit to conduct a supply of AC power to a load, the firing angle corresponding to a firing delay time, after zero-crossings of the AC waveform, at which to fire the switching circuit; selecting a control signal pulse duration, the control signal pulse duration being a duration of time for a control signal to be held in an ON state to latch the switching circuit to conduct the supply of AC power to the load, wherein the selecting the control signal pulse duration comprises selecting, for the control signal pulse duration, and based on the determined firing angle, between: (i) a fixed duration of time that begins at the firing delay time and ends after the fixed duration of time; and (ii) a variable duration of time that begins at the firing delay time and ends at a preset unlatch time of the AC waveform; and controlling the supply of AC power to the load based on the selected control signal pulse duration, wherein the controlling holds the control signal in the ON state for the selected control signal pulse duration in selectively controlling the switching circuit to conduct the supply of AC power to the load.

B2. The method of B1, wherein based on the firing delay time being (i) less than a first threshold delay or (ii) greater than a second threshold delay, the second threshold delay being greater than the first threshold delay, the selecting the control signal pulse duration selects the fixed duration of time.

B3. The method of B2, wherein the first threshold delay is between 2.3 milliseconds and 3.3 milliseconds.

B4. The method of B2, wherein the second threshold delay is between 5.0 milliseconds and 6.0 milliseconds.

B5. The method of B1, wherein based on the firing delay time being equal to or greater than a first threshold delay and less than or equal to a second threshold delay, the second threshold delay being greater than the first threshold delay, the selecting the control signal pulse duration selects the variable duration of time.

B6. The method of B5, wherein the first threshold delay is between 2.3 milliseconds and 3.3 milliseconds, and wherein the second threshold delay is between 5.0 milliseconds and 6.0 milliseconds.

B7. The method of B1, wherein the fixed duration of time is between 50 and 1 millisecond.

B8. The method of B1, wherein the variable duration of time is between 100 microseconds and 2.5 milliseconds.

B9. The method of B1, further comprising detecting a voltage sag in the AC waveform, wherein the selecting the control signal pulse duration is performed based on detecting the voltage sag.

B10. The method of B9, wherein for at least some time prior to detecting the voltage sag, the electrical load controller is configured to hold the control signal in the ON state for the fixed duration of time regardless of the determined firing angle.

B11. The method of B1, further comprising: based on changing the desired load level setting to a different load level, repeating the selecting a control signal pulse duration and the controlling the supply of AC power to the load based on the selected control signal pulse duration.

B12. An electrical load controller for controlling conduction of a supply of alternating current (AC) power to a load, the electrical load controller comprising: a line input terminal and a load output terminal, the line input terminal configured to be electrically coupled to the supply of AC power, and the load output terminal configured to be electrically coupled to the load; a switching circuit electrically coupled in series between the line input terminal and the load output terminal, the switching circuit having an ON state in which the switching circuit conducts the supply of AC power to the load, and an OFF state in which the switching circuit does not conduct the supply of AC power to the load, the switching circuit configured to be selectively controlled by varying a control signal to the switching circuit between the ON state and the OFF state; and a controller configured to perform: based on a desired load level setting of the electrical load controller, determining a firing angle, of an alternating current (AC) waveform, at which to fire the switching circuit of the electrical load controller to selectively control the switching circuit to conduct the supply of AC power to the load, the firing angle corresponding to a firing delay time, after zero-crossings of the AC waveform, at which to fire the switching circuit; selecting a control signal pulse duration, the control signal pulse duration being a duration of time for the control signal to be held in the ON state to latch the switching circuit to conduct the supply of AC power to the load, wherein the selecting the control signal pulse duration comprises selecting, for the control signal pulse duration, and based on the determined firing angle, between: (i) a fixed duration of time that begins at the firing delay time and ends after the fixed duration of time; and (ii) a variable duration of time that begins at the firing delay time and ends at a preset unlatch time of the AC waveform; and controlling the supply of AC power to the load based on the selected control signal pulse duration, wherein the controlling holds the control signal in the ON state for the selected control signal pulse duration in selectively controlling the switching circuit to conduct the supply of AC power to the load.

B13. The electrical load controller of B12, wherein based on the firing delay time being (i) less than a first threshold delay or (ii) greater than a second threshold delay, the second threshold delay being greater than the first threshold delay, the selecting the control signal pulse duration selects the fixed duration of time.

B14. The electrical load controller of B13, wherein the first threshold delay is between 2.3 milliseconds and 3.3 milliseconds.

B15. The electrical load controller of B13, wherein the second threshold delay is between 5.0 milliseconds and 6.0 milliseconds.

B16. The electrical load controller of B12, wherein based on the firing delay time being equal to or greater than a first threshold delay and less than or equal to a second threshold delay, the second threshold delay being greater than the first threshold delay, the selecting the control signal pulse duration selects the variable duration of time.

B17. The electrical load controller of B16, wherein the first threshold delay is between 2.3 milliseconds and 3.3 milliseconds, and wherein the second threshold delay is between 5.0 milliseconds and 6.0 milliseconds.

B18. The electrical load controller of B12, wherein the fixed duration of time is between 50 and 1 millisecond.

B19. The electrical load controller of B12, wherein the variable duration of time is between 100 microseconds and 2.5 milliseconds.

B20. The electrical load controller of B12, wherein the method further comprises detecting a voltage sag in the AC waveform, wherein the selecting the control signal pulse duration is performed based on detecting the voltage sag.

B21. The electrical load controller of B20, wherein for at least some time prior to detecting the voltage sag, the electrical load controller is configured to hold the control signal in the ON state for the fixed duration of time regardless of the determined firing angle.

B22. The electrical load controller of B12, wherein the controller is further configured to perform: based on changing the desired load level setting to a different load level, repeating the selecting a control signal pulse duration and the controlling the supply of AC power to the load based on the selected control signal pulse duration.

B23. A computer program product for operating an electrical load controller, the computer program product comprising: a computer readable storage medium readable by a processing circuit and storing instructions for execution by the processing circuit to perform a method comprising: based on a desired load level setting of the electrical load controller, determining a firing angle, of an alternating current (AC) waveform, at which to fire a switching circuit of the electrical load controller to selectively control the switching circuit to conduct a supply of AC power to a load, the firing angle corresponding to a firing delay time, after zero-crossings of the AC waveform, at which to fire the switching circuit; selecting a control signal pulse duration, the control signal pulse duration being a duration of time for a control signal to be held in an ON state to latch the switching circuit to conduct the supply of AC power to the load, wherein the selecting the control signal pulse duration comprises selecting, for the control signal pulse duration, and based on the determined firing angle, between: (i) a fixed duration of time that begins at the firing delay time and ends after the fixed duration of time; and (ii) a variable duration of time that begins at the firing delay time and ends at a preset unlatch time of the AC waveform; and controlling the supply of AC power to the load based on the selected control signal pulse duration, wherein the controlling holds the control signal in the ON state for the selected control signal pulse duration in selectively controlling the switching circuit to conduct the supply of AC power to the load.

B24. The computer program product of B23, wherein based on the firing delay time being (i) less than a first threshold delay or (ii) greater than a second threshold delay, the second threshold delay being greater than the first threshold delay, the selecting the control signal pulse duration selects the fixed duration of time.

B25. The computer program product of B23, wherein the first threshold delay is between 2.3 milliseconds and 3.3 milliseconds.

B26. The computer program product of B23, wherein the second threshold delay is between 5.0 milliseconds and 6.0 milliseconds.

B27. The computer program product of B23, wherein based on the firing delay time being equal to or greater than a first threshold delay and less than or equal to a second threshold delay, the second threshold delay being greater than the first threshold delay, the selecting the control signal pulse duration selects the variable duration of time.

B28. The computer program product of B27, wherein the first threshold delay is between 2.3 milliseconds and 3.3 milliseconds, and wherein the second threshold delay is between 5.0 milliseconds and 6.0 milliseconds.

B29. The computer program product of B23, wherein the fixed duration of time is between 50 and 1 millisecond.

B30. The computer program product of B23, wherein the variable duration of time is between 100 microseconds and 2.5 milliseconds.

B31. The computer program product of B23, wherein the method further comprises detecting a voltage sag in the AC waveform, wherein the selecting the control signal pulse duration is performed based on detecting the voltage sag.

B32. The computer program product of B31, wherein for at least some time prior to detecting the voltage sag, the electrical load controller is configured to hold the control signal in the ON state for the fixed duration of time regardless of the determined firing angle.

B33. The computer program product of B23, wherein the method further comprises: based on changing the desired load level setting to a different load level, repeating the selecting a control signal pulse duration and the controlling the supply of AC power to the load based on the selected control signal pulse duration.

C1. A method of operating an electrical load controller, the method comprising: based on a desired load level setting of the electrical load controller, determining a firing angle, of an alternating current (AC) waveform, at which to fire a switching circuit of the electrical load controller to selectively control the switching circuit to conduct a supply of AC power to a load, the firing angle corresponding to a firing delay time, after zero-crossings of the AC waveform, at which to fire the switching circuit; detecting whether a voltage sag is present in the AC waveform; selecting a control signal pulse duration, the control signal pulse duration being a duration of time for a control signal to be held in an ON state to latch the switching circuit to conduct the supply of AC power to the load, wherein the selecting the control signal pulse duration comprises selecting, for the control signal pulse duration, and based on the determined firing angle, between: (i) a fixed duration of time that begins at the firing delay time and ends after the fixed duration of time; and (ii) a variable duration of time; wherein the selecting is based further on determining that the firing delay time is less than a first threshold delay, and on the detecting whether the voltage sag is present in the AC waveform; and controlling the supply of AC power to the load based on the selected control signal pulse duration, wherein the controlling holds the control signal in the ON state for the selected control signal pulse duration in selectively controlling the switching circuit to conduct the supply of AC power to the load.

C2. The method of C1, wherein based on detecting that voltage sag is not present in the AC waveform, the selecting the control signal pulse duration selects the fixed duration of time.

C3. The method of C1, wherein based on detecting that the voltage sag is present in the AC waveform, the selecting selects the variable duration of time, wherein the variable duration of time ends at a present unlatch time of the AC waveform.

C4. The method of C3, wherein the preset unlatch time corresponds to a second threshold delay.

C5. The method of C3, wherein the variable duration of time begins at the firing delay time.

C6. The method of C3, wherein the variable duration of time begins at the first threshold delay.

C7. An electrical load controller for controlling conduction of a supply of alternating current (AC) power to a load, the electrical load controller comprising: a line input terminal and a load output terminal, the line input terminal configured to be electrically coupled to the supply of AC power, and the load output terminal configured to be electrically coupled to the load; a switching circuit electrically coupled in series between the line input terminal and the load output terminal, the switching circuit configured to be selectively controlled by varying a control signal to a switching circuit between an ON state in which the switching circuit conducts the supply of AC power to the load, and an OFF state; and a controller, the controller configured to perform a method comprising: based on a desired load level setting of the electrical load controller, determining a firing angle, of an alternating current (AC) waveform, at which to fire a switching circuit of the electrical load controller to selectively control the switching circuit to conduct a supply of AC power to a load, the firing angle corresponding to a firing delay time, after zero-crossings of the AC waveform, at which to fire the switching circuit; detecting whether a voltage sag is present in the AC waveform; selecting a control signal pulse duration, the control signal pulse duration being a duration of time for a control signal to be held in an ON state to latch the switching circuit to conduct the supply of AC power to the load, wherein the selecting the control signal pulse duration comprises selecting, for the control signal pulse duration, and based on the determined firing angle, between: (i) a fixed duration of time that begins at the firing delay time and ends after the fixed duration of time; and (ii) a variable duration of time; wherein the selecting is based further on determining that the firing delay time is less than a first threshold delay, and on the detecting whether the voltage sag is present in the AC waveform; and controlling the supply of AC power to the load based on the selected control signal pulse duration, wherein the controlling holds the control signal in the ON state for the selected control signal pulse duration in selectively controlling the switching circuit to conduct the supply of AC power to the load.

C8. The electrical load controller of C7, wherein based on detecting that voltage sag is not present in the AC waveform, the selecting the control signal pulse duration selects the fixed duration of time.

C9. The electrical load controller of C7, wherein based on detecting that the voltage sag is present in the AC waveform, the selecting selects the variable duration of time, wherein the variable duration of time ends at a present unlatch time of the AC waveform.

C10. The electrical load controller of C9, wherein the preset unlatch time corresponds to a second threshold delay.

C11. The electrical load controller of C9, wherein the variable duration of time begins at the firing delay time.

C12. The electrical load controller of C9, wherein the variable duration of time begins at the first threshold delay.

C13. A computer program product for operating an electrical load controller, the computer program product comprising: a computer readable storage medium readable by a processing circuit and storing instructions for execution by the processing circuit to perform a method comprising: based on a desired load level setting of the electrical load controller, determining a firing angle, of an alternating current (AC) waveform, at which to fire a switching circuit of the electrical load controller to selectively control the switching circuit to conduct a supply of AC power to a load, the firing angle corresponding to a firing delay time, after zero-crossings of the AC waveform, at which to fire the switching circuit; detecting whether a voltage sag is present in the AC waveform; selecting a control signal pulse duration, the control signal pulse duration being a duration of time for a control signal to be held in an ON state to latch the switching circuit to conduct the supply of AC power to the load, wherein the selecting the control signal pulse duration comprises selecting, for the control signal pulse duration, and based on the determined firing angle, between: (i) a fixed duration of time that begins at the firing delay time and ends after the fixed duration of time; and (ii) a variable duration of time; wherein the selecting is based further on determining that the firing delay time is less than a first threshold delay, and on the detecting whether the voltage sag is present in the AC waveform; and controlling the supply of AC power to the load based on the selected control signal pulse duration, wherein the controlling holds the control signal in the ON state for the selected control signal pulse duration in selectively controlling the switching circuit to conduct the supply of AC power to the load.

C14. The computer program product of C13, wherein based on detecting that voltage sag is not present in the AC waveform, the selecting the control signal pulse duration selects the fixed duration of time.

C15. The computer program product of C13, wherein based on detecting that the voltage sag is present in the AC waveform, the selecting selects the variable duration of time, wherein the variable duration of time ends at a present unlatch time of the AC waveform.

C16. The computer program product of C15, wherein the preset unlatch time corresponds to a second threshold delay.

C17. The computer program product of C15, wherein the variable duration of time begins at the firing delay time.

C18. The computer program product of C15, wherein the variable duration of time begins at the first threshold delay.

D1. A method of operating an electrical load controller, the method comprising: selecting a detection window of time that extends for a predetermined duration of time established based on a frequency of an alternating current (AC) waveform, the selected detection window extending from a selected first time to a selected second time, the selected first time being a point in time from which receipt of an indication of a next zero-crossing of the AC waveform is to be deemed a valid zero-crossing indication of the next zero-crossing, the next zero-crossing being a point of transition of the AC waveform from a first half cycle to a second half cycle of the AC waveform, the AC waveform oscillating though full cycles, each full cycle comprising a positive half cycle and a negative half cycle of the AC waveform, wherein the selected first time is during the first half cycle and before an expected time of the next zero-crossing, and is selected based on the expected time of the next zero-crossing such that the second time, which is equal to the first time plus the duration of time, occurs during the second half cycle, after the expected time of the next zero-crossing; using a microprocessor to receive a zero-crossing signal provided by a zero-crossing detector circuit of the electrical load controller during the selected detection window and ascertain a time of the next zero-crossing occurring during that selected detection window at or after the first time and before or at the second time; and controlling a supply of AC power to a load, wherein the controlling uses the ascertained time of the next zero-crossing in firing a switching circuit of the electrical load controller to selectively control the switching circuit to conduct the supply of AC power to the load.

The terminology used herein is for the purpose of describing particular embodiments only and is not intended to be limiting. As used herein, the singular forms “a”, “an” and “the” are intended to include the plural forms as well, unless the context clearly indicates otherwise. It will be further understood that the terms “comprises” and/or “comprising”, when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method of operating an electrical load controller, the method comprising:

based on a desired load level setting of the electrical load controller, determining a firing angle, of an alternating current (AC) waveform, at which to fire a switching circuit of the electrical load controller to selectively control the switching circuit to conduct a supply of AC power to a load, the firing angle corresponding to a firing delay time, after zero-crossings of the AC waveform, at which to fire the switching circuit;

detecting whether a voltage sag is present in the AC waveform;

selecting a control signal pulse duration, the control signal pulse duration being a duration of time for a control signal to be held in an ON state to latch the switching circuit to conduct the supply of AC power to the load, wherein the selecting the control signal pulse duration comprises selecting, for the control signal pulse duration, and based on the determined firing angle, between:

(i) a fixed duration of time that begins at the firing delay time and ends after the fixed duration of time; and (ii) a variable duration of time;

wherein the selecting is based further on determining that the firing delay time is less than a first threshold delay, and on the detecting whether the voltage sag is present in the AC waveform; and controlling the supply of AC power to the load based on the selected control signal pulse duration, wherein the controlling holds the control signal in the ON state for the selected control signal pulse duration in selectively controlling the switching circuit to conduct the supply of AC power to the load.

2. The method of claim 1, wherein based on detecting that voltage sag is not present in the AC waveform, the selecting the control signal pulse duration selects the fixed duration of time.

3. The method of claim 1, wherein based on detecting that the voltage sag is present in the AC waveform, the selecting selects the variable duration of time, wherein the variable duration of time ends at a present unlatch time of the AC waveform.

4. The method of claim 3, wherein the preset unlatch time corresponds to a second threshold delay.

5. The method of claim 3, wherein the variable duration of time begins at the firing delay time or the first threshold delay.

6. The method of claim 1, wherein the ON state of the control signal comprises the control signal being LOW.

7. The method of claim 1, wherein the holding the control signal in the ON state for the selected control signal pulse duration holds the control signal in the ON state during points at which voltage sag is present in the AC waveform.

8. The method of claim 1, wherein the voltage sag is present in the AC waveform between (i) a zero-crossing at a beginning of a half-cycle of the AC waveform and (ii) the firing delay time in the half-cycle.

9. An electrical load controller for controlling conduction of a supply of alternating current (AC) power to a load, the electrical load controller comprising:

a line input terminal and a load output terminal, the line input terminal configured to be electrically coupled to the supply of AC power, and the load output terminal configured to be electrically coupled to the load;

a switching circuit electrically coupled in series between the line input terminal and the load output terminal, the switching circuit having an ON state in which the switching circuit conducts the supply of AC power to the load, and an OFF state in which the switching circuit does not conduct the supply of AC power to the load, the switching circuit configured to be selectively controlled by varying a control signal to the switching circuit between the ON state and the OFF state; and a controller configured to perform:

selecting a detection window of time having a duration based on a predetermined duration of time, the selected detection window extending from a selected first time to a selected second time and straddling an expected time of a next zero-crossing of an alternating current (AC) waveform the AC waveform oscillating though full cycles, each full cycle comprising a positive half cycle and a negative half cycle;

monitoring a zero-crossing signal for a zero-crossing indication, of the next zero-crossing, occurring within the selected detection window;

ascertaining a time of the next zero-crossing based on the monitoring; and selectively controlling a supply of AC power to a load, wherein the controlling uses the ascertained time of the next zero-crossing of the AC waveform to fire a switching circuit of the electrical load controller.

10. The electrical load controller of claim 9, wherein based on the monitoring determining that no indication of the next zero-crossing was provided by the zero-crossing signal from the selected first time to the selected second time, the ascertaining comprises:

using the expected time of the next zero-crossing as an assumed time of the next zero-crossing; and determining, based on the assumed time of the next zero-crossing, an assumed time to fire the switching circuit after the assumed time of the next zero-crossing.

11. The electrical load controller of claim 10, wherein the controller is further configured to perform turning the control signal to the ON state at the assumed time to fire the switching circuit, and holding the control signal in the ON state for a conduction period during a current half cycle of the AC waveform.

12. The electrical controller of claim 11, wherein the controller is further configured to perform:

ignoring one or more zero-crossing indications received during a next half cycle, of the AC waveform, that immediately follows the current half cycle; or refraining from monitoring for zero-crossing indications received during a next half cycle, of the AC waveform, that immediately follows the current half cycle.

13. The electrical load controller of claim 9, wherein the electrical load controller is configured with a default pulse duration, the default pulse duration being a duration of time for a control signal to be held in an ON state to latch the switching circuit, and wherein, based on the monitoring determining that no indication of the next zero-crossing was provided by the zero-crossing signal from the selected first time to the selected second time, the controller is further configured to perform turning the control signal to the ON state at an assumed time to fire the switching circuit and holding the control signal in the ON state for an extended duration of time that is longer than the default pulse duration.

14. The electrical load controller of claim 13, wherein the electrical load controller is configured to hold the control signal in the ON state for the extended duration of time further based on:

determining that no indication of zero-crossing persists across consecutive cycles of the AC waveform; or a fire time to fire the switching circuit of the electrical load controller in a half cycle of the AC waveform being greater than 1 millisecond prior to the end of the half cycle.

15. The electrical load controller of claim 13, wherein the extended duration of time extends:

until a time prior to an anticipated time of a next zero-crossing of interest, and the electrical load controller holds the control signal in the ON state until the time prior to the anticipated time; or until a predefined amount of time prior to an end of a half cycle of the AC waveform.

16. The electrical load controller of claim 13, wherein the extended duration of time extends to no greater than a maximum amount of time, the maximum amount of time being an amount of time that corresponds to 26 degrees out of 360 degrees in a full cycle of the AC waveform.

17. The electrical load controller of claim 13, wherein the default pulse duration and the extended duration of time are determined as amounts of time corresponding to selected fractions of a full cycle of the AC waveform.

18. A method of operating an electrical load controller, the method comprising:

selecting a detection window of time having a duration based on a predetermined duration of time, the selected detection window extending from a selected first time to a selected second time and straddling an expected time of a next zero-crossing of an alternating current (AC) waveform, the AC waveform oscillating though full cycles, each full cycle comprising a positive half cycle and a negative half cycle;

monitoring a zero-crossing signal for a zero-crossing indication, of the next zero-crossing, occurring within the selected detection window;

ascertaining a time of the next zero-crossing based on the monitoring; and selectively controlling a supply of AC power to a load, wherein the controlling uses the ascertained time of the next zero-crossing of the AC waveform to fire a switching circuit of the electrical load controller.

19. The method of claim 18, wherein based on the monitoring determining that no indication of the next zero-crossing was provided by the zero-crossing signal from the selected first time to the selected second time, the ascertaining comprises:

using the expected time of the next zero-crossing as an assumed time of the next zero-crossing; and determining, based on the assumed time of the next zero-crossing, an assumed time to fire the switching circuit after the assumed time of the next zero-crossing;

wherein the controller is further configured to perform:

turning the control signal to the ON state at the assumed time to fire the switching circuit;

holding the control signal in the ON state for a conduction period during a current half cycle of the AC waveform; and ignoring one or more zero-crossing indications received during a next half cycle, of the AC waveform, that immediately follows the current half cycle, or refraining from monitoring for zero-crossing indications received during a next half cycle, of the AC waveform, that immediately follows the current half cycle.

20. The method of claim 18, wherein the electrical load controller is configured with a default pulse duration, the default pulse duration being a duration of time for a control signal to be held in an ON state to latch the switching circuit, and wherein, based on the monitoring determining that no indication of the next zero-crossing was provided by the zero-crossing signal from the selected first time to the selected second time, the method further comprises turning the control signal to the ON state at an assumed time to fire the switching circuit and holding the control signal in the ON state for an extended duration of time that is longer than the default pulse duration.

21. The method of claim 20, wherein the holding of the control signal in the ON state for the extended duration of time is further based on:

determining that no indication of zero-crossing persists across consecutive cycles of the AC waveform; or a fire time to fire the switching circuit of the electrical load controller in a half cycle of the AC waveform being greater than 1 millisecond prior to the end of the half cycle.

22. The method of claim 20, wherein the extended duration of time:

extends until a time prior to an anticipated time of a next zero-crossing of interest, and the electrical load controller holds the control signal in the ON state until the time prior to the anticipated time;

extends until a predefined amount of time prior to an end of a half cycle of the AC waveform; or extends to no greater than a maximum amount of time, the maximum amount of time being an amount of time that corresponds to 26 degrees out of 360 degrees in a full cycle of the AC waveform.

23. The method of claim 20, wherein the default pulse duration and the extended duration of time are determined as amounts of time corresponding to selected fractions of a full cycle of the AC waveform.

* * * * *